United States Patent
Kajikawa et al.

(10) Patent No.: US 12,465,559 B2
(45) Date of Patent: Nov. 11, 2025

(54) FLUORESCENT CURABLE DENTAL COMPOSITION AND CURED PRODUCT THEREOF

(71) Applicant: KURARAY NORITAKE DENTAL INC., Kurashiki (JP)

(72) Inventors: Tatsuya Kajikawa, Chiba (JP); Yuki Suga, Niigata (JP)

(73) Assignee: KURARAY NORITAKE DENTAL INC., Kurashiki (JP)

( * ) Notice: Subject to any disclaimer, the term of this patent is extended or adjusted under 35 U.S.C. 154(b) by 764 days.

(21) Appl. No.: 17/786,071

(22) PCT Filed: Dec. 16, 2020

(86) PCT No.: PCT/JP2020/047055
§ 371 (c)(1),
(2) Date: Jun. 16, 2022

(87) PCT Pub. No.: WO2021/125246
PCT Pub. Date: Jun. 24, 2021

(65) Prior Publication Data
US 2023/0075693 A1    Mar. 9, 2023

(30) Foreign Application Priority Data

Dec. 17, 2019 (JP) ................... 2019-227752

(51) Int. Cl.
- *A61K 6/80* (2020.01)
- *A61K 6/30* (2020.01)
- *A61K 6/71* (2020.01)

(52) U.S. Cl.
CPC .............. *A61K 6/80* (2020.01); *A61K 6/30* (2020.01); *A61K 6/71* (2020.01)

(58) Field of Classification Search
CPC ............................ A61K 6/887; C08L 33/10
See application file for complete search history.

(56) References Cited

U.S. PATENT DOCUMENTS

| | | | | |
|---|---|---|---|---|
| 5,304,586 A | * | 4/1994 | Hammesfahr | A61K 6/893 501/59 |
| 5,795,497 A | * | 8/1998 | Kimura | C08F 16/30 252/182.18 |
| 2011/0172323 A1 | * | 7/2011 | Akizumi | C08F 222/1025 522/28 |
| 2012/0012789 A1 | * | 1/2012 | Yamada | C04B 35/488 252/301.4 F |
| 2019/0315713 A1 | * | 10/2019 | Rando | C07D 401/12 |

FOREIGN PATENT DOCUMENTS

| | | |
|---|---|---|
| EP | 1226807 A1 | 7/2002 |
| JP | H02-233605 A | 9/1990 |
| JP | H09-3109 A | 1/1997 |
| JP | H10-1473 A | 1/1998 |
| JP | H10-245525 A | 9/1998 |
| JP | H11-92461 A | 4/1999 |
| JP | 2002255722 A | 9/2002 |
| JP | 2003096122 A | 4/2003 |
| JP | 2009215443 A | 9/2009 |
| JP | 2009280673 A | 12/2009 |
| JP | 2010222466 A | 10/2010 |
| JP | 2013234259 A | 11/2013 |
| JP | 2014507410 A | 3/2014 |
| JP | 2015063490 A * | 4/2015 |
| JP | 2017141188 A | 8/2017 |
| WO | WO-2010045096 A2 | 4/2010 |
| WO | WO-2012095803 A1 | 7/2012 |

OTHER PUBLICATIONS

International Search Report issued Feb. 22, 2021 in PCT/JP2020/047055 (with English translation), 5 pages.
Extended European Search Report issued Nov. 6, 2023 in European Patent Application No. 20903363.8, 9 pages.

* cited by examiner

*Primary Examiner* — Peter A Salamon
(74) *Attorney, Agent, or Firm* — Element IP, PLC

(57) ABSTRACT

The present invention provides a dental curable composition that shows fluorescence sufficient to enable highly aesthetic harmonious restoration almost indistinguishable from surrounding natural teeth, and that, while having sufficient mechanical strength and radiopacity and good ease of polishing as a restorative material, desirably resists discoloration not only in the intraoral environment but under accelerated heating conditions and under xenon light, without losing fluorescence even under these conditions. The present invention also provides a cured product of such a dental curable composition. The present invention relates to a dental curable composition comprising a polymerizable monomer (A), an inorganic filler (B), a polymerization initiator (C), and a fluorescent agent (D), wherein the fluorescent agent (D) comprises a 9- to 11-membered benzo-fused heterocyclic compound containing two or more heteroatoms (excluding benzoimidazole compounds).

16 Claims, No Drawings

FLUORESCENT CURABLE DENTAL COMPOSITION AND CURED PRODUCT THEREOF

TECHNICAL FIELD

The present invention relates to a dental material that can be used for partial or whole replacement of natural tooth in the field of dentistry, particularly a dental curable composition that can be suitably used in applications such as dental composite resins and dental mill blanks.

BACKGROUND ART

Natural teeth show fluorescence. The fluorescence of natural teeth makes the teeth luminous under natural light, whereas it presents a bluish-white color under blacklight. This poses an issue in a restorative dental treatment when the restoration uses a non-fluorescent dental material made of a curable composition containing components such as a polymerizable monomer and a polymerization initiator because, depending on the surrounding environment, the dental material appears different in shade and becomes distinguishable from natural teeth in areas of teeth restored with the dental material. Today's dental materials are required to have high levels of aesthetic quality that make the restored portions almost indistinguishable from natural teeth, regardless of the environment. With the objective of improving aesthetic quality, attempts have been made to provide a dental material with fluorescence, comparable to that of natural teeth, by adding an organic fluorescent dye to a dental material.

For example, Patent Literatures 1 and 2 disclose dental materials containing a fluorescent agent of phthalic acid esters, such as 2,5-dihydroxydiethylterephthalate, in order to impart the same level of fluorescence exhibited by natural teeth.

However, the fluorescent agent of phthalic acid esters described in Patent Literatures 1 and 2, when present in a dental curable composition containing certain components (specifically, a dental curable composition containing a filler containing, for example, zirconia or alumina), is known to produce a thick shade of yellow in a cured product after polymerization and cure. That is, there is difficulty in reproducing the shade of natural teeth.

In response to this issue, Patent Literature 3 proposes a curable composition that specifies the contents of an amine compound, a phthalic acid ester fluorescent agent, and a radiopaque acidic filler. However, investigations by the present inventors revealed that the composition described in Patent Literature 3 cannot provide satisfactory fluorescence under simulated clinical conditions, and needs further improvements.

Patent Literature 4 proposes an inorganic fluorescent agent that does not involve discoloration even in the presence of zirconia. However, common knowledge is that the fluorescence intensity of an inorganic fluorescent agent decreases with decreasing particle diameter, and, in order to ensure sufficient fluorescence, an inorganic fluorescent agent needs to be present in a dental curable composition in the form of coarse particles of several micrometers. The presence of such coarse inorganic fluorescence particles can cause various problems in dental composite resins and dental resin blocks for CAD/CAM, such as a decrease of polishability, a decrease of mechanical strength, and inconsistent fluorescence.

CITATION LIST

Patent Literature

Patent Literature 1: JP 2(1990)-233605 A
Patent Literature 2: JP 2009-280673 A
Patent Literature 3: JP 2017-141188 A
Patent Literature 4: JP 2010-222466 A

SUMMARY OF INVENTION

Technical Problem

As discussed above, no dental curable composition or cured product is available that shows sufficient fluorescence, and that excels in aesthetics and durability while having sufficient mechanical strength and radiopacity and retaining ease of polishing.

The present invention was made to provide a solution to the foregoing issues of related art, and an object of the present invention is to provide a dental curable composition that shows fluorescence sufficient to enable highly aesthetic harmonious restoration almost indistinguishable from surrounding natural teeth, and that, while having sufficient mechanical strength and radiopacity and good ease of polishing as a restorative material, desirably resists discoloration not only in the intraoral environment but under accelerated heating conditions and under xenon light, without losing fluorescence even under these conditions. Another object of the present invention is to provide a cured product of such a dental curable composition.

Solution to Problem

The present inventors conducted intensive studies to achieve the foregoing objects, and found that a dental curable composition and a cured product thereof containing a compound having a specific structure show sufficient fluorescence, and excel in aesthetics and durability while having sufficient mechanical strength and radiopacity and retaining ease of polishing.

Specifically, the present invention includes the following.

[1] A dental curable composition comprising a polymerizable monomer (A), an inorganic filler (B), a polymerization initiator (C), and a fluorescent agent (D), wherein the fluorescent agent (D) comprises a 9- to 11-membered benzo-fused heterocyclic compound containing two or more heteroatoms (excluding benzoimidazole compounds).

[2] The dental curable composition according to [1], wherein the 9- to 11-membered benzo-fused heterocyclic compound containing two or more heteroatoms comprises a fluorescent agent (D-1) representing a benzo-fused 6-membered heterocyclic compound having two heteroatoms.

[3] The dental curable composition according to [2], wherein the fluorescent agent (D-1) comprises a compound having a benzodiazinone skeleton, and/or a compound having a benzoxazinone skeleton.

[4] The dental curable composition according to [3], wherein the compound having a benzodiazinone skeleton is a compound having a skeleton represented by the following general formula (5),

[Chem. 1]

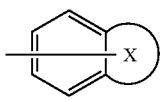
(5)

wherein X represents a 6-membered heterocyclic ring having two nitrogen atoms, and the 6-membered heterocyclic ring has at least one oxo group, and may be optionally substituted.

[5] The dental curable composition according to [3] or [4], wherein the compound having a benzodiazinone skeleton is a compound (D-1a) having a quinazolinone skeleton.

[6] The dental curable composition according to [3], wherein the fluorescent agent (D-1) comprises a compound having a benzoxazinone skeleton.

[7] The dental curable composition according to [6], wherein the compound having a benzoxazinone skeleton is a compound having a skeleton represented by the following general formula (6),

[Chem. 2]

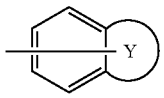
(6)

wherein Y represents a 6-membered heterocyclic ring having one nitrogen atom and one oxygen atom, and the 6-membered heterocyclic ring has at least one oxo group, and may be optionally substituted.

[8] The dental curable composition according to any one of [2] to [7], wherein the fluorescent agent (D-1) is a compound having a moiety represented by the following general formula (1) or (2),

[Chem. 3]

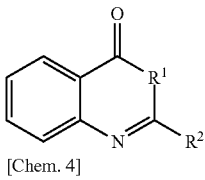
(1)

[Chem. 4]

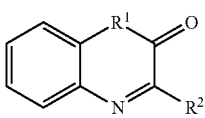
(2)

wherein $R^1$ in general formulae (1) and (2) is an oxygen atom or —NH—, and $R^2$ in general formulae (1) and (2) represents an optionally substituted aromatic group.

[9] The dental curable composition according to any one of [2] to [7], wherein the fluorescent agent (D-1) comprises at least one compound selected from the group consisting of 2-(2-hydroxyphenyl)-4(1H)-quinazolinone, 2-(2-hydroxyphenyl)-4H-3,1-benzoxazin-4-one, N-[2-(4(1H)-quinazolinon-2-yl)phenyl]benzenesulfoneamide, N-[2-(4-oxo-1,3-benzoxazin-2-yl)phenyl]benzenesulfoneamide, 7-dimethylamino-3-[2-[4-(trifluoromethyl)phenyl]ethenyl]-2H-1,4-benzoxazin-2-one, 7-dimethylamino-3-[2-[2,3,4,5,6-pentafluorophenyl]ethenyl]-2H-1,4-benzoxazin-2-one, and 7-dimethylamino-3-[2-[2,4-bis(trifluoromethyl)phenyl]ethenyl]-2H-1,4-benzoxazin-2-one.

[10] The dental curable composition according to any one of [2] to [9], wherein the fluorescent agent (D) further comprises a fluorescent agent (D-2) representing a benzo-fused 5-membered heterocyclic compound having one nitrogen atom and one oxygen atom.

[11] The dental curable composition according to [10], wherein the fluorescent agent (D-2) is a fluorescent agent (D-2a) representing a compound having a benzoxazole skeleton.

[12] The dental curable composition according to [11], wherein the fluorescent agent (D-2a) is a compound having a moiety represented by the following general formula (3),

[Chem. 5]

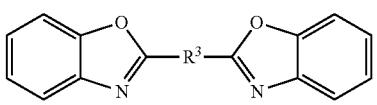
(3)

wherein $R^3$ represents an optionally substituted aromatic group, or an optionally substituted vinylene group.

[13] The dental curable composition according to [11] or [12], wherein the fluorescent agent (D-2a) is a compound represented by the following formula (12).

[Chem. 6]

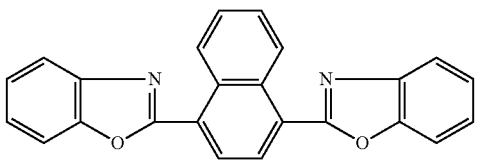
(12)

[14] The dental curable composition according to any one of [1] to [13], wherein the inorganic filler (B) is an inorganic filler containing at least one metal compound selected from the group consisting of zirconium oxide, aluminum oxide, ytterbium oxide, and ytterbium fluoride.

[15] The dental curable composition according to any one of [1] to [14], wherein the inorganic filler (B) has a specific surface area of 10 to 300 $m^2/g$.

[16] A dental composite resin comprising a dental curable composition of any one of [1] to [15].

[17] A dental mill blank comprising a cured product of a dental curable composition of any one of [1] to [15].

Advantageous Effects of Invention

According to the present invention, a dental curable composition can be provided that shows fluorescence sufficient to enable highly aesthetic harmonious restoration almost indistinguishable from surrounding natural teeth, and that, while having sufficient mechanical strength and radiopacity and good ease of polishing as a restorative material, desirably resists discoloration not only in the intraoral environment but under accelerated heating conditions and under xenon light, without losing fluorescence even under these conditions. The present invention can also provide a cured product of such a dental curable composition. A dental curable composition and a cured product thereof according to the present invention can be suitably used in applications such as dental composite resins and dental mill blanks.

DESCRIPTION OF EMBODIMENTS

The present invention is described below in detail. A dental curable composition of the present invention comprises a polymerizable monomer (A), an inorganic filler (B), a polymerization initiator (C), and a fluorescent agent (D), wherein the fluorescent agent (D) comprises a 9- to 11-membered benzo-fused heterocyclic compound containing two or more heteroatoms (excluding benzoimidazole compounds). A dental curable composition and a cured product thereof having this configuration show sufficient fluorescence, and excel in aesthetics and durability while having sufficient mechanical strength, radiopacity, and ease of polishing, making it suitable for use in applications such as dental composite resins and dental mill blanks.

Polymerizable Monomer (A)

The polymerizable monomer (A) in a dental curable composition of the present invention may be a known polymerizable monomer used for dental curable compositions, particularly preferably a radical polymerizable monomer. Examples of the radical polymerizable monomer include esters of unsaturated carboxylic acids such as α-cyanoacrylic acid, (meth)acrylic acid, α-halogenated acrylic acid, crotonic acid, cinnamic acid, sorbic acid, maleic acid, and itaconic acid; (meth)acrylamide; derivatives of (meth)acrylamide; vinyl esters; vinyl ethers; mono-N-vinyl derivatives; and styrene derivatives. The polymerizable monomer (A) may be used alone, or two or more thereof may be used in combination. Preferred are esters of unsaturated carboxylic acids, and derivatives of (meth)acrylamide. Esters of (meth)acrylic acid, and derivatives of (meth)acrylamide are more preferred, and esters of (meth)acrylic acid are even more preferred. As used herein, the term "(meth)acryl" is intended to be inclusive of both methacryl and acryl. The term "(meth)acrylic monomer" is intended to be inclusive of both (meth)acrylic acid esters and derivatives of (meth)acrylamide. Examples of (meth)acrylic acid esters and derivatives of (meth)acrylamide are as follows.

(i) Monofunctional (Meth)Acrylic Acid Esters and Derivatives of (Meth)Acrylamide Examples include methyl (meth)acrylate, isobutyl (meth)acrylate, benzyl (meth)acrylate, dodecyl (meth)acrylate, 2-(N,N-dimethylamino)ethyl (meth)acrylate, 2,3-dibromopropyl (meth)acrylate, 3-(meth)acryloyloxypropyltrimethoxysilane, 11-(meth)acryloyloxyundecyltrimethoxysilane, 2-hydroxyethyl (meth)acrylate, 3-hydroxypropyl (meth)acrylate, 4-hydroxybutyl (meth)acrylate, 6-hydroxyhexyl (meth)acrylate, 10-hydroxydecyl (meth)acrylate, propylene glycol mono(meth)acrylate, glycerin mono(meth)acrylate, erythritol mono(meth)acrylate, phenoxyethylene glycol (meth)acrylate, isobornyl (meth)acrylate, 3-phenoxybenzyl (meth)acrylate, N-methylol (meth)acrylamide, N-hydroxyethyl (meth)acrylamide, N,N-bis(hydroxyethyl)(meth)acrylamide, N,N-dimethyl (meth)acrylamide, N,N-diethyl (meth)acrylamide, N,N-di-n-propyl (meth)acrylamide, N-ethyl-N-methyl (meth)acrylamide, (meth)acryloylmorpholine, (meth)acryloyloxydodecylpyridinium bromide, (meth)acryloyloxydodecylpyridinium chloride, (meth)acryloyloxyhexadecylpyridinium bromide, (meth)acryloyloxyhexadecylpyridinium chloride, ethoxylated-o-phenylphenol (meth)acrylate, ethoxylated-m-phenylphenol (meth)acrylate, ethoxylated-p-phenylphenol (meth)acrylate, propoxylated-o-phenylphenol (meth)acrylate, propoxylated-m-phenylphenol (meth)acrylate, propoxylated-p-phenylphenol (meth)acrylate, o-phenoxybenzyl (meth)acrylate, m-phenoxybenzyl (meth)acrylate, p-phenoxybenzyl (meth)acrylate, 2-(o-phenoxyphenyl)ethyl (meth)acrylate, 2-(m-phenoxyphenyl)ethyl (meth)acrylate, and 2-(p-phenoxyphenyl)ethyl (meth)acrylate. In view of improving ease of handling of a paste of the dental curable composition obtained and providing desirable mechanical strength after cure, ethoxylated-o-phenylphenol (meth)acrylate and m-phenoxybenzyl (meth)acrylate are most preferred.

(ii) Bifunctional (Meth)Acrylic Acid Esters

Examples include aromatic bifunctional (meth)acrylic acid esters, and aliphatic bifunctional (meth)acrylic acid esters.

Examples of aromatic bifunctional (meth)acrylic acid esters include 2,2-bis((meth)acryloyloxyphenyl)propane, 2,2-bis[4-(3-acryloyloxy-2-hydroxypropoxy)phenyl]propane, 2,2-bis[4-(3-methacryloyloxy-2-hydroxypropoxy)phenyl]propane (commonly known as Bis-GMA), 2,2-bis(4-(meth)acryloyloxypolyethoxyphenyl)propane, 2-(4-(meth)acryloyloxydiethoxyphenyl)-2-(4-(meth)acryloyloxyethoxyphenyl)propane, 2-(4-(meth)acryloyloxydiethoxyphenyl)-2-(4-(meth)acryloyloxytriethoxyphenyl)propane, 2,2-bis(4-(meth)acryloyloxypropoxyphenyl)propane, 2,2-bis(4-(meth)acryloyloxyisopropoxyphenyl)propane, 2,2-bis(4-(meth)acryloyloxydipropoxyphenyl)propane, 2-(4-(meth)acryloyloxydipropoxyphenyl)-2-(4-(meth)acryloyloxytriethoxyphenyl)propane, 9,9-bis[4-(2-(meth)acryloyloxyethoxy)phenyl]fluorene, 9,9-bis[4-(2-(meth)acryloyloxypolyethoxy)phenyl]fluorene, diphenyl bis[3-(meth)acryloyloxypropyl]silane, and methylphenyl bis[3-(meth)acryloyloxypropyl]silane.

Examples of aliphatic bifunctional (meth)acrylic acid esters include glycerol di(meth)acrylate, ethylene glycol di(meth)acrylate, diethylene glycol di(meth)acrylate, triethylene glycol diacrylate, triethylene glycol dimethacrylate (commonly known as 3G), propylene glycol di(meth)acrylate, butylene glycol di(meth)acrylate, neopentyl glycol di(meth)acrylate, 1,3-butanediol di(meth)acrylate, 1,5-pentanediol di(meth)acrylate, 1,6-hexanediol di(meth)acrylate, 1,10-decanediol di(meth)acrylate, 1,12-dodecanediol di(meth)acrylate, 1,2-bis(3-(meth)acryloyloxy-2-hydroxypropyloxy)ethane, tricyclodecanedimethanol di(meth)acrylate, 2,2,4-trimethylhexamethylenebis(2-carbamoyloxyethyl)diacrylate, 2,2,4-trimethylhexamethylenebis(2-carbamoyloxyethyl)dimethacrylate (commonly known as UDMA), and dicyclohexyl bis[3-(meth)acryloyloxypropyl]silane.

In view of advantages such as improved ease of handling of the dental curable composition and improved mechanical strength of the cured product produced, the bifunctional (meth)acrylic acid esters are preferably 2,2-bis[4-(3-acryloyloxy-2-hydroxypropoxy)phenyl]propane, 2,2-bis[4-(3-methacryloyloxy-2-hydroxypropoxy)phenyl]propane (Bis-GMA), 2,2-bis(4-(meth)acryloyloxypolyethoxyphenyl)propane (average number of moles of ethyleneoxy group added: 1 to 30), triethylene glycol diacrylate, triethylene glycol dimethacrylate (3G), 1,10-decanediol di(meth)acrylate, 1,12-dodecanediol di(meth)acrylate, 1,2-bis(3-(meth)acryloyloxy-2-hydroxypropyloxy)ethane, tricyclodecane dimethanol di(meth)acrylate, 2,2,4-trimethylhexamethylenebis(2-carbamoyloxyethyl)diacrylate, and 2,2,4-trimethylhexamethylenebis(2-carbamoyloxyethyl)dimethacrylate (UDMA), more preferably 2,2-bis[4-(3-methacryloyloxy-2-hydroxypropoxy)phenyl]propane (Bis-GMA), 2,2-bis(4-methacryloyloxypolyethoxyphenyl)propane (average number of moles of ethyleneoxy group added: 1 to 30), triethylene glycol dimethacrylate (3G), 1,10-decanediol dimethacrylate, 1,12-dodecanediol dimethacrylate, 1,2-bis(3-methacryloyloxy-2-hydroxypropyloxy)ethane, tricyclodecanedimethanol dimethacrylate, and 2,2,4-trimethylhexamethylenebis(2-carbamoyloxyethyl)dimethacrylate (UDMA), even more preferably 2,2-bis[4-(3-methacryloyloxy-2-hydroxypropoxy)phenyl]propane (Bis-GMA), 2,2-bis(4-methacryloyloxypolyethoxyphenyl)propane (average number of moles of ethyleneoxy group added is about 2.6), and triethylene glycol dimethacrylate (3G).

(iii) Tri- and Higher-Functional (Meth)Acrylic Acid Esters

Examples include trimethylolpropane tri(meth)acrylate, trimethylolethane tri(meth)acrylate, trimethylolmethane tri(meth)acrylate, pentaerythritol tri(meth)acrylate, pentaerythritol tetra(meth)acrylate, dipentaerythritol tri(meth)acrylate, dipentaerythritol tetra(meth)acrylate, dipentaerythritol penta(meth)acrylate, N,N'-(2,2,4-trimethylhexamethylene)bis[2-(aminocarboxy)propane-1,3-diol] tetra(meth)acrylate, and 1,7-di(meth)acryloyloxy-2,2,6,6-tetra(meth)acryloyloxymethyl-4-oxaheptane.

In view of advantages such as improved adhesive properties of the dental curable composition to materials such as tooth structure, metal, and ceramic, the polymerizable monomer (A) may in some cases preferably include a functional monomer with which the dental curable composition can have adhesive properties to such adherends.

In view of having desirable adhesive properties to tooth structure and base metal, the functional monomer may be, for example, a polymerizable monomer having a phosphoric acid group, such as 2-(meth)acryloyloxyethyl dihydrogen phosphate, 10-(meth)acryloyloxydecyl dihydrogen phosphate, or 2-(meth)acryloyloxyethylphenyl hydrogen phosphate; or a polymerizable monomer having a carboxylic acid group, such as 11-(meth)acryloyloxyundecane-1,1-dicarboxylic acid, or 4-(meth)acryloyloxyethoxycarbonylphthalic acid. In view of having desirable adhesive properties to noble metals, the functional monomer may be, for example, 10-mercaptodecyl (meth)acrylate, 6-(4-vinylbenzyl-n-propyl)amino-1,3,5-triazine-2,4-dithione, any of the thiouracil derivatives mentioned in JP-A-10(1998)-1473, or any of the compounds having a sulfur element mentioned in JP-A-11(1999)-92461. In view of effectiveness of bonding to ceramics, porcelains, and other dental curable compositions, the functional monomer may be, for example, a silane coupling agent such as γ-(meth)acryloyloxypropyltrimethoxysilane.

The content of the polymerizable monomer (A) in a dental curable composition of the present invention is not particularly limited. However, in view of considerations such as ease of handling of the dental curable composition obtained or mechanical strength of the cured product, the content of polymerizable monomer (A) is preferably 1 mass % or more, more preferably 2 mass % or more, even more preferably 5 mass % or more, or may be 8 mass % or more, or 15 mass % or more, and is preferably 70 mass % or less, more preferably 50 mass % or less, even more preferably 40 mass % or less, particularly preferably 30 mass % or less, based on the total mass of the dental curable composition. The content of the polymerizable monomer (A) in a dental curable composition of the present invention is preferably at least 3 parts by mass, more preferably at least 4 parts by mass, even more preferably at least 5 parts by mass, particularly preferably at least 10 parts by mass, and is preferably at most 90 parts by mass, more preferably at most 70 parts by mass, even more preferably at most 60 parts by mass, particularly preferably at most 35 parts by mass based on total 100 parts by mass of polymerizable monomer (A) and inorganic filler (B).

Inorganic Filler (B)

A dental curable composition of the present invention comprises an inorganic filler (B).

The inorganic filler (B) has an average particle diameter of preferably 0.01 μm or more, more preferably 0.05 μm or more, even more preferably 0.1 μm or more. The average particle diameter of inorganic filler (B) may be 0.2 μm or more. The inorganic filler (B) has an average particle diameter of preferably 50 μm or less, more preferably 20 μm or less, even more preferably 10 μm or less, particularly preferably 7 μm or less. With the average particle diameter of inorganic filler (B) having these lower limits, the dental curable composition obtained can more effectively reduce stickiness, and ease of handling improves. With the average particle diameter of inorganic filler (B) having the foregoing upper limits, the dental curable composition obtained can more effectively reduce runniness or roughness, and ease of handling improves. When the inorganic filler (B) is an agglomerated particle (secondary particle), the average particle diameter of inorganic filler (B) means an average particle diameter of the agglomerated particle (secondary particle).

The average particle diameter of inorganic filler (B) can be determined by using a laser diffraction scattering method, or by observing particles with an electron microscope. Specifically, a laser diffraction scattering method is more convenient for particles of 0.1 μm or greater, whereas electron microscopy is a more convenient method of particle diameter measurement for ultrafine particles of less than 0.1 μm. Here, 0.1 μm is a measured value by a laser diffraction scattering method. For example, in the case of a laser diffraction scattering method, the average particle diameter can be measured by volume with a laser diffraction particle size distribution analyzer (e.g., SALD-2300 manufactured by Shimadzu Corporation), using ethanol or a 0.2% sodium hexametaphosphate aqueous solution as dispersion medium. For electron microscopy, a scanning electron microscope (e.g., SU3800 or S-4000 manufactured by Hitachi High-Technologies Corporation) may be used. In electron microscopy, for example, particles may be photographed with an electron microscope, and the size of particles (at least 200 particles) observed in a unit field of the captured image may be measured using image-analyzing particle-size-distribution measurement software (Macview, manufactured by Mountech Co., Ltd.). Here, the particle diameter is determined as an arithmetic mean value of the maximum and minimum lengths of particles, and the average primary particle diameter is calculated from the number of particles and the particle diameter. More specifically, the average particle diameter of inorganic filler (B) can be measured using the method described in the EXAMPLES section.

The overall shape of particles of inorganic filler (B) is not particularly limited, and the inorganic filler (B) may be used in the form of an irregularly shaped powder or a spherical powder. A dental curable composition produced with an irregularly shaped inorganic filler (B) can provide a cured product that particularly excels in mechanical strength and wear resistance. A dental curable composition produced with a spherical inorganic filler (B) can have smoother and more flowable paste properties, and improved ease of handling.

The overall shape of inorganic filler (B) can be appropriately selected according to intended use of the dental curable composition.

Examples of the inorganic filler (B) include various types of glasses. (For example, glasses containing silica as a main component, and, optionally, oxides of elements such as heavy metals, boron, and aluminum. Examples include glass powders of common compositions, for example, such as fused silica, quartz, soda-lime-silica glass, E glass, C glass, and borosilicate glass (PYREX® glass); and dental glass powders, such as barium glass (for example, GM27884 and 8235 manufactured by Schott, and E-2000 and E-3000 manufactured by Esstech), strontium-borosilicate glass (for example, E-4000 manufactured by Esstech), lanthanum glass-ceramics (for example, GM31684 manufactured by Schott), and fluoroaluminosilicate glass (for example, GM35429, G018-091, and G018-117 manufactured by Schott)). Other examples of inorganic filler (B) include ceramics, alumina, composite oxides (e.g., silica-titania, silica-zirconia, silica-ytterbia), diatomaceous earth, kaolin, clay minerals (e.g., montmorillonite), activated earth, synthetic zeolite, mica, calcium fluoride, ytterbium fluoride, yttrium fluoride, calcium phosphate, barium sulfate, zirconium oxide, titanium oxide, and hydroxyapatite. These may be used alone, or two or more thereof may be used in combination. The inorganic filler (B) is preferably one containing silica as a main component (containing at least 5 mass %, preferably at least 10 mass % silica). Preferably, a dental curable composition of the present invention comprises an inorganic filler containing a high-radiopacity metal compound such as zirconium oxide, aluminum oxide, or ytterbium oxide (for example, barium glass, alumina, silica-titania, silica-zirconia, silica-ytterbia), or ytterbium fluoride.

In the present invention, because of the tendency to improve ease of polishing, the inorganic filler (B) has a specific surface area of preferably 10 m$^2$/g or more, more preferably 15 m$^2$/g or more, even more preferably 18 m$^2$/g or more, particularly preferably 20 m$^2$/g or more, and is 300 m$^2$/g or less, preferably 250 m$^2$/g or less, more preferably 200 m$^2$/g or less, or may be 190 m$^2$/g or less, 170 m$^2$/g or less, or 150 m$^2$/g or less. Ease of polishing improves even more greatly with the specific surface area of inorganic filler (B) having these lower limits. By setting the foregoing upper limits for the specific surface area of inorganic filler (B), the inorganic filler (B) can be added in increased amounts, and the mechanical strength of the cured product improves. When the inorganic filler (B) is an agglomerated particle (secondary particle), the specific surface area of inorganic filler (B) means a specific surface area of the agglomerated particle (secondary particle).

The specific surface area of inorganic filler (B) can be measured by using the BET method. Specifically, for example, a specific surface area measurement device (e.g., the BELSORP-mini series manufactured by MicrotracBEL Corp.) can be used for the measurement of specific surface area. When finding the specific surface area of inorganic filler (B) using this method for example, it is preferable to measure the specific surface area after ashing the inorganic filler (B) in advance, for example, by processing the inorganic filler (B) at 450° C. for 4 hours, in order to eliminate the influence of organic materials when the inorganic filler (B) is surface treated (described later) or when the inorganic filler (B) is an organic-inorganic composite filler. Preferably, such ashing is also performed when determining the specific surface area of the inorganic filler (B) contained in the dental curable composition. More specifically, the specific surface area of inorganic filler (B) can be measured using the method described in the EXAMPLES section.

In the present invention, the inorganic filler (B) may have a form of an agglomerated particle formed by agglomeration of the inorganic filler. Commercially available inorganic fillers typically exist in the form of aggregates. The cohesion of commercially available inorganic fillers is so weak that these fillers break into particle sizes indicated by the manufacturer when 10 mg of its powder is added and ultrasonically dispersed at 40 W and 39 KHz for 30 minutes in 300 mL of water or in the same amount of a dispersion medium prepared by adding a surfactant (e.g., at most 5 mass % of sodium hexametaphosphate) to water. In contrast, the agglomerated particles in the present invention are strongly held together, and become hardly dispersed even under these conditions.

In a preferred method of preparing a strong agglomerate of particles from an aggregate of commercially available inorganic fillers, the inorganic filler is heated to a temperature range just below the temperature that melts the inorganic filler so that the adjoining inorganic filler particles under the applied heat lightly fuse together and increase cohesion. Here, the inorganic filler may have a form of an aggregate before heating, in order to control the shape of the agglomerated particle. An aggregate can be formed, for example, by applying pressure to the inorganic filler placed in a suitable container, or by dispersing the inorganic filler in a solvent, and removing the solvent using a method such as spray drying.

In another preferred method of preparing an agglomerated particle formed by strong aggregation of inorganic filler particles, a sol such as a silica sol, an alumina sol, a titania sol, or a zirconia sol prepared by using a wet method is dried using a method such as freeze drying or spray drying, and optionally subjected to a heat treatment. In this way, an agglomerated particle formed by strong aggregation of particles can be obtained with ease. Specific examples of the sols include fine spherical silica particles (Seahostar® manufactured by Nippon Shokubai Co., Ltd. under this trade name; e.g., the KE series, a surface-treated type), a silica organosol (OSCAL® manufactured by JGC C & C under this trade name), a titania sol (QUEEN TITANIC series manufactured by Nissan Chemical Corporation under this trade name), a silica sol (SNOWTEX® manufactured by Nissan Chemical Corporation under this trade name), an alumina sol (Aluminasol-100, Aluminasol-200, Aluminasol-520 manufactured by Nissan Chemical Corporation under these trade names), and a zirconia sol (NanoUse® ZR series manufactured by Nissan Chemical Corporation under this trade name). The shape of the inorganic filler particle is not particularly limited, and may be appropriately selected for use.

In the present invention, the inorganic filler (B) may be present as an organic-inorganic composite filler in the dental curable composition. The organic-inorganic composite filler means a filler containing the inorganic filler and a polymer of a polymerizable monomer.

The organic-inorganic composite filler in the present invention is preferably one in which an inorganic filler having an average particle diameter of 5 μm or less is dispersed in an organic matrix. The average particle diameter of the inorganic filler is more preferably 2 μm or less, even more preferably 1 μm or less.

The method of preparation of organic-inorganic composite filler is not particularly limited in the present invention. For example, the organic-inorganic composite filler can be prepared by adding a known polymerizable monomer and a known polymerization initiator to the inorganic filler, polymerizing the filler mixture in paste form by a polymerization method such as solution polymerization, suspension polymerization, emulsion polymerization, or bulk polymerization, and pulverizing the resulting polymer.

The refractive index of inorganic filler (B) is not particularly limited. However, the transparency of the cured product can more easily increase when the inorganic filler (B) has a refractive index close to the refractive indices of the components other than the inorganic filler (B) in the dental curable composition. In this respect, the refractive index of inorganic filler (B) is preferably 1.45 or more, more preferably 1.50 or more, even more preferably 1.51 or more, and is preferably 1.63 or less, more preferably 1.60 or less, even more preferably 1.58 or less. The refractive index of inorganic filler (B) can be controlled, for example, by changing the type or proportion of the metallic elements contained in the inorganic filler (B).

A surface treatment of inorganic filler (B) is not necessarily required. However, a surface treatment is preferred because it provides a number of advantages, including improved compatibility with polymerizable monomer (A) as a result of hydrophobization of the surface of inorganic filler (B), allowing the inorganic filler (B) to be added in increased amounts. A surface treatment agent may be used for surface treatment. The type of surface treatment agent is not particularly limited, and a known surface treatment agent may be used, for example, such as a silane coupling agent, an organotitanium coupling agent, an organozirconium coupling agent, or an organoaluminum coupling agent. The surface treatment agent may be used alone, or two or more thereof may be used in combination. A silane coupling agent is preferred in view of considerations such as compatibility between polymerizable monomer (A) and inorganic filler (B), and availability.

The silane coupling agent is preferably a compound represented by the following general formula (4), though the type of silane coupling agent is not particularly limited.

[Chem. 7]

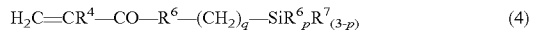

$$H_2C=CR^4-CO-R^5-(CH_2)_q-SiR^6_pR^7_{(3-p)} \quad (4)$$

wherein $R^4$ is a hydrogen atom or a methyl group, $R^5$ is an oxygen atom, a sulfur atom, or $-NR^8-$ ($R^8$ is a hydrogen atom, or an aliphatic group having 1 to 8 carbon atoms; the aliphatic group may be linear, branched, or cyclic), $R^6$ is a hydrolyzable group, $R^7$ is a hydrocarbon group having 1 to 6 carbon atoms, p is an integer of 1 to 3, q is an integer of 1 to 13, and a plurality of $R^6$ and $R^7$ each may be the same or different from each other.

In the general formula (4), $R^4$ is a hydrogen atom or a methyl group, preferably a methyl group. $R^5$ is an oxygen atom, a sulfur atom, or $-NR^8-$, preferably an oxygen atom. $R^8$ is a hydrogen atom, or an aliphatic group having 1 to 8 carbon atoms (may be linear, branched, or cyclic), and the C1 to C8 aliphatic group represented by $R^8$ may be a saturated aliphatic group (for example, an alkyl group, or a cycloalkylene group such as a cyclohexyl group), or an unsaturated aliphatic group (for example, an alkenyl group or an alkynyl group). In view of considerations such as availability, ease of production, and chemical stability, $R^8$ is preferably a saturated aliphatic group, more preferably an alkyl group. Examples of the alkyl group include methyl, ethyl, n-propyl, isopropyl, n-butyl, isobutyl, sec-butyl, tert-butyl, n-pentyl, isopentyl, n-hexyl, n-heptyl, 2-methylhexyl, and n-octyl. $R^8$ is preferably a hydrogen atom, or an alkyl group having 1 to 4 carbon atoms, more preferably a hydrogen atom, or an alkyl group having 1 to 3 carbon atoms, even more preferably a hydrogen atom.

In the general formula (4), examples of the hydrolyzable group represented by $R^6$ include alkoxy groups such as a methoxy group, an ethoxy group, and a butoxy group; halogen atoms such as a chlorine atom and a bromine atom; and an isocyanate group. When a plurality of $R^6$ exists, the plurality of $R^6$ may be the same or different from each other. $R^6$ is preferably an alkoxy group, more preferably a methoxy group or an ethoxy group, even more preferably a methoxy group.

In the general formula (4), the C1 to C6 hydrocarbon group represented by $R^7$ may be, for example, an alkyl group having 1 to 6 carbon atoms (may be cyclic), an alkenyl group having 2 to 6 carbon atoms (may be cyclic), or an alkynyl group having 2 to 6 carbon atoms. When a plurality of $R^7$ exists, the plurality of $R^7$ may be the same or different from each other.

Examples of the alkyl group having 1 to 6 carbon atoms include methyl, ethyl, n-propyl, isopropyl, n-butyl, isobutyl, sec-butyl, tert-butyl, n-pentyl, isopentyl, neopentyl, tert-pentyl, n-hexyl, cyclopropyl, cyclobutyl, cyclopentyl, and cyclohexyl.

Examples of the alkenyl group having 2 to 6 carbon atoms include vinyl, allyl, 1-methylvinyl, 1-propenyl, butenyl, pentenyl, hexenyl, cyclopropenyl, cyclobutenyl, cyclopentenyl, and cyclohexenyl.

Examples of the alkynyl group having 2 to 6 carbon atoms include ethynyl, 1-propynyl, 2-propynyl, 1-butynyl, 1-methyl-2-propynyl, 2-butynyl, 3-butynyl, 1-pentynyl, 1-ethyl-2-propynyl, 2-pentynyl, 3-pentynyl, 1-methyl-2-butynyl, 4-pentynyl, 1-methyl-3-butynyl, 2-methyl-3-butynyl, 1-hexynyl, 2-hexynyl, 1-ethyl-2-butynyl, 3-hexynyl, 1-methyl-2-pentynyl, 1-methyl-3-pentynyl, 4-methyl-1-pentynyl, 3-methyl-1-pentynyl, 5-hexynyl, and 1-ethyl-3-butynyl.

In the general formula (4), p is an integer of 1 to 3, preferably 2 or 3, more preferably 3. In the general formula (4), q is an integer of 1 to 13, preferably an integer of 2 to 12, more preferably an integer of 3 to 11.

Specific examples of the silane coupling agent represented by the general formula (4) include methacryloyloxymethyltrimethoxysilane, 2-methacryloyloxyethyltrimethoxysilane, 3-methacryloyloxypropyltrimethoxysilane, 4-methacryloyloxybutyltrimethoxysilane, 5-methacryloyloxypentyltrimethoxysilane, 6-methacryloyloxyhexyltrimethoxysilane, 7-methacryloyloxyheptyltrimethoxysilane, 8-methacryloyloxyoctyltrimethoxysilane, 9-methacryloyloxynonyltrimethoxysilane, 10-methacryloyloxydecyltrimethoxysilane, 11-methacryloyloxyundecyltrimethoxysilane, 12-methacryloyloxydodecyltrimethoxysilane, 13-methacryloyloxytridecyltrimethoxysilane, 11-methacryloyloxyundecyldichloromethylsilane, 11-methacryloyloxyundecyltrichlorosilane, and 12-methacryloyloxydodecyldimethoxymethylsilane. The silane coupling agent may be used alone, or two or more thereof may be used in combination. In view of availability, the silane coupling agent is preferably 3-methacryloyloxypropyltrimethoxysilane. In view of further improvement of compatibility between polymerizable monomer (A) and inorganic filler (B), the silane coupling agent is preferably 8-methacryloyloxyoctyltrimethoxysilane, 9-methacryloyloxynonyltrimethoxysilane, 10-methacryloyloxydecyltrimethoxysilane, or 11-methacryloyloxyundecyltrimethoxysilane.

The method of surface treatment is not particularly limited, and a known method may be used.

The amount of surface treatment agent is not particularly limited. However, the surface treatment agent may be used in an amount of, for example, at least 1 part by mass relative to 100 parts by mass of the filler before surface treatment. The amount of surface treatment agent is preferably at least 5 parts by mass, more preferably at least 6 parts by mass, even more preferably at least 8 parts by mass, particularly preferably at least 10 parts by mass, most preferably at least 20 parts by mass, and is preferably at most 50 parts by mass, more preferably at most 45 parts by mass, even more preferably at most 40 parts by mass. With the surface treatment agent used within these lower limits, the mechanical strength of the cured product produced more easily improves. With the foregoing upper limits, a decrease of mechanical strength in the cured product due to excess amounts of surface treatment agent can be reduced.

The content of the inorganic filler (B) in a dental curable composition of the present invention is not particularly limited (the content of inorganic filler (B) after surface treatment when the inorganic filler (B) is surface treated). However, in view of considerations such as ease of handling of the dental curable composition and the mechanical strength of the cured product produced, the content of the inorganic filler (B) is preferably 10 mass % or more, more preferably 30 mass % or more, even more preferably 50 mass % or more, particularly preferably 65 mass % or more, and is preferably 97 mass % or less, more preferably 96 mass % or less, even more preferably 95 mass % or less, particularly preferably 90 mass % or less, based on the total mass of the dental curable composition. With the inorganic filler (B) being present within these lower limits, the dental curable composition can have improved ease of handling because of more effectively reduced stickiness, and the cured product can have improved mechanical strength. With the inorganic filler (B) being present within the foregoing upper limits, the dental curable composition can be prevented from becoming excessively hard, and ease of handling improves. The content of the inorganic filler (B) in a dental curable composition of the present invention is preferably at least 10 parts by mass, more preferably at least 30 parts by mass, even more preferably at least 50 parts by mass, particularly preferably at least 65 parts by mass, and is preferably at most 97 parts by mass, more preferably at most 96 parts by mass, even more preferably at most 95 parts by mass, particularly preferably at most 90 parts by mass based on total 100 parts by mass of polymerizable monomer (A) and inorganic filler (B).

A dental curable composition of the present invention may comprise an organic filler. Examples of the organic filler include acrylic polymers (such as polymethyl methacrylate, polyethyl methacrylate, a methyl methacrylate-ethyl methacrylate copolymer, crosslinked polymethyl methacrylate, crosslinked polyethyl methacrylate, and polyamides), polyvinyl chloride, polystyrene, chloroprene rubber, nitrile rubber, an ethylene-vinyl acetate copolymer, a styrene-butadiene copolymer, an acrylonitrile-styrene copolymer, and an acrylonitrile-styrene-butadiene copolymer. These may be used alone, or two or more thereof may be used as a mixture. The shape of organic filler is not particularly limited, and the particle size of organic filler may be appropriately selected for use. In view of considerations such as ease of handling and mechanical strength of the composition obtained, the organic filler has an average particle diameter is preferably 0.001 to 50 μm, more preferably 0.001 to 10 μm. The average particle diameter of organic filler can be measured using the same method used for the measurement of average particle diameter of inorganic filler (B).

Polymerization Initiator (C)

A dental curable composition of the present invention comprises a polymerization initiator (C). The polymerization initiator (C) may be selected from polymerization initiators commonly used in industry, particularly those used in dentistry. Preferred for use are photopolymerization initiators and chemical polymerization initiators. The polymerization initiator (C) may be used alone, or two or more thereof may be used in appropriate combinations.

Examples of the photopolymerization initiators include (bis)acylphosphine oxides, ketals, α-diketones, and coumarin compounds.

Examples of acylphosphine oxides in the (bis)acylphosphine oxides include 2,4,6-trimethylbenzoyldiphenylphosphine oxide, 2,6-dimethoxybenzoyldiphenylphosphine oxide, 2,6-dichlorobenzoyldiphenylphosphine oxide, 2,4,6-trimethylbenzoylmethoxyphenylphosphine oxide, 2,4,6-trimethylbenzoylethoxyphenylphosphine oxide, 2,3,5,6-tetramethylbenzoyldiphenylphosphine oxide, benzoyl di(2,6-dimethylphenyl)phosphonate, and salts of these (e.g., sodium salts, potassium salts, and ammonium salts). Examples of bisacylphosphine oxides include bis(2,6-dichlorobenzoyl)phenylphosphine oxide, bis(2,6-dichlorobenzoyl)-2,5-dimethylphenylphosphine oxide, bis(2,6-dichlorobenzoyl)-4-propylphenylphosphine oxide, bis(2,6-dichlorobenzoyl)-1-naphthylphosphine oxide, bis(2,6-dimethoxybenzoyl)phenylphosphine oxide, bis(2,6-dimethoxybenzoyl)-2,4,4-trimethylpentylphosphine oxide, bis(2,6-dimethoxybenzoyl)-2,5-dimethylphenylphosphine oxide, bis(2,4,6-trimethylbenzoyl)phenylphosphine oxide, bis(2,5,6-trimethylbenzoyl)-2,4,4-trimethylpentylphosphine oxide, and salts of these (e.g., sodium salts, potassium salts, and ammonium salts).

Particularly preferred examples of the (bis)acylphosphine oxides include sodium salts of 2,4,6-trimethylbenzoyldiphenylphosphine oxide, 2,4,6-trimethylbenzoylmethoxyphenylphosphine oxide, bis(2,4,6-trimethylbenzoyl)phenylphosphine oxide, and 2,4,6-trimethylbenzoylphenylphosphine oxide.

Examples of the ketals include benzyl dimethyl ketal, and benzyl diethyl ketal.

Examples of the α-diketones include diacetyl, benzyl, camphorquinone, 2,3-pentadione, 2,3-octadione, 9,10-phenanthrenequinone, 4,4'-oxybenzyl, and acenaphthenequinone. Particularly preferred is camphorquinone for its maximum absorption wavelength occurring in the visible light region.

Examples of the coumarin compounds include compounds mentioned in JP 9(1997)-3109 A and JP 10(1998)-245525 A, such as 3,3'-carbonyl bis(7-diethylaminocoumarin), 3-(4-methoxybenzoyl)coumarin, 3-thienoylcoumarin, 3-benzoyl-5,7-dimethoxycoumarin, 3-benzoyl-7-methoxycoumarin, 3-benzoyl-6-methoxycoumarin, 3-benzoyl-8-methoxycoumarin, 3-benzoylcoumarin, 7-methoxy-3-(p-nitrobenzoyl)coumarin, 3-(p-nitrobenzoyl)coumarin, 3,5-carbonylbis(7-methoxycoumarin), 3-benzoyl-6-bromocoumarin, 3,3'-carbonylbiscoumarin, 3-benzoyl-7-dimethylaminocoumarin, 3-benzoylbenzo[f]coumarin, 3-carboxycoumarin, 3-carboxy-7-methoxycoumarin, 3-ethoxycarbonyl-6-methoxycoumarin, 3-ethoxycarbonyl-8-methoxycoumarin, 3-acetylbenzo[f]coumarin, 3-benzoyl-6-nitrocoumarin, 3-benzoyl-7-diethylaminocoumarin, 7-dimethylamino-3-(4-methoxybenzoyl)coumarin, 7-diethylamino-3-(4-methoxybenzoyl)coumarin, 7-diethylamino-3-(4-diethylamino)coumarin, 7-methoxy-3-(4-methoxybenzoyl)coumarin, 3-(4-nitrobenzoyl)benzo[f]coumarin, 3-(4-ethoxycinnamoyl)-7-methoxycoumarin, 3-(4-dimethylaminocinnamoyl)coumarin, 3-(4-diphenylaminocinnamoyl)coumarin, 3-[(3-dimethylbenzothiazol-2-ylidene)acetyl]coumarin, 3-[(1-methylnaphtho[1,2-d]thiazol-2-ylidene)acetyl]coumarin, 3,3'-carbonylbis(6-methoxycoumarin), 3,3'-carbonylbis(7-acetoxycoumarin), 3,3'-carbonylbis(7-dimethylaminocoumarin), 3-(2-benzothiazolyl)-7-(diethylamino)coumarin, 3-(2-benzothiazolyl)-7-(dibutylamino)coumarin, 3-(2-benzoimidazolyl)-7-(diethylamino)coumarin, 3-(2-benzothiazolyl)-7-(dioctylamino)coumarin, 3-acetyl-7-(dimethylamino)coumarin, 3,3'-carbonylbis(7-dibutylaminocoumarin), 3,3'-carbonyl-7-diethylaminocoumarin-7'-bis(butoxyethyl)aminocoumarin, 10-[3-[4-(dimethylamino)phenyl]-1-oxo-2-propenyl]-2,3,6,7-tetrahydro-1,1,7,7-tetramethyl-1H,5H,11H-[1]benzopyrrano[6,7,8-ij]quinolizin-11-one, and 10-(2-benzothiazolyl)-2,3,6,7-tetrahydro-1,1,7,7-tetramethyl-1H,5H,11H-[1]benzopyrrano[6,7,8-ij]quinolizin-11-one.

Particularly preferred coumarin compounds are 3,3'-carbonylbis(7-diethylaminocoumarin), and 3,3'-carbonyl bis(7-dibutylaminocoumarin).

When the photopolymerization initiator is at least one selected from the group consisting of a (bis)acylphosphine oxide, an α-diketone, and a coumarin compound, a dental curable composition can be provided that has desirable photocurability both in the visible light region and the near ultraviolet region, and that shows sufficient photocurability regardless of whether the light source used is a halogen lamp, a light emitting diode (LED), or a xenon lamp.

The chemical polymerization initiators are preferably organic peroxides. The organic peroxides used as chemical polymerization initiators are not particularly limited, and known organic peroxides may be used. Typical examples of organic peroxides include ketone peroxides, hydroperoxides, diacyl peroxides, dialkyl peroxides, peroxyketals, peroxyesters, and peroxydicarbonates.

Examples of the ketone peroxides include methyl ethyl ketone peroxide, methyl isobutyl ketone peroxide, methyl cyclohexanone peroxide, and cyclohexanone peroxide.

Examples of the hydroperoxides include 2,5-dimethylhexane-2,5-dihydroperoxide, diisopropylbenzene hydroperoxide, cumene hydroperoxide, t-butyl hydroperoxide, and 1,1,3,3-tetramethylbutyl hydroperoxide.

Examples of the diacyl peroxides include acetyl peroxide, isobutyryl peroxide, benzoyl peroxide, decanoyl peroxide, 3,5,5-trimethylhexanoyl peroxide, 2,4-dichlorobenzoyl peroxide, and lauroyl peroxide.

Examples of the dialkyl peroxides include di-t-butyl peroxide, dicumyl peroxide, t-butylcumyl peroxide, 2,5-dimethyl-2,5-di(t-butylperoxy)hexane, 1,3-bis(t-butylperoxyisopropyl)benzene, and 2,5-dimethyl-2,5-di(t-butylperoxy)-3-hexyne.

Examples of the peroxy ketals include 1,1-bis(t-butylperoxy)-3,3,5-trimethylcyclohexane, 1,1-bis(t-butylperoxy)cyclohexane, 2,2-bis(t-butylperoxy)butane, 2,2-bis(t-butylperoxy)octane, n-butyl 4,4-bis(t-butylperoxy) valerate.

Examples of the peroxyesters include α-cumyl peroxyneodecanoate, t-butyl peroxyneodecanoate, t-butyl peroxypivalate, 2,2,4-trimethylpentyl peroxy-2-ethylhexanoate, t-amyl peroxy-2-ethylhexanoate, t-butyl peroxy-2-ethylhexanoate, di-t-butyl peroxyisophthalate, di-t-butyl peroxyhexahydroterephthalate, t-butyl peroxy-3,3,5-trimethylhexanoate, t-butyl peroxyacetate, t-butyl peroxybenzoate, and t-butyl peroxymaleic acid.

Examples of the peroxydicarbonates include di-3-methoxyperoxydicarbonate, di(2-ethylhexyl)peroxydicarbonate, bis(4-t-butylcyclohexyl)peroxydicarbonate, diisopropylperoxydicarbonate, di-n-propylperoxydicarbonate, di(2-ethoxyethyl)peroxydicarbonate, and diallylperoxydicarbonate.

From an overall balance of safety, storage stability, and radical generating potential, preferred among these organic peroxides are diacyl peroxides, particularly benzoyl peroxide.

The content of the polymerization initiator (C) in a dental curable composition of the present invention is not particularly limited. However, in view of considerations such as curability of the dental curable composition obtained, the content of the polymerization initiator (C) is preferably at least 0.001 parts by mass, more preferably at least 0.01 parts by mass, even more preferably at least 0.02 parts by mass, particularly preferably at least 0.1 parts by mass relative to total 100 parts by mass of the polymerizable monomer (A). The content of the polymerization initiator (C) is preferably at most 30 parts by mass, more preferably at most 20 parts by mass, even more preferably at most 15 parts by mass, particularly preferably at most 10 parts by mass relative to total 100 parts by mass of the polymerizable monomer (A) because the polymerization initiator (C) may precipitate out of the dental curable composition when its content is too high. The content of the polymerization initiator (C) may be at most 5 parts by mass, or at most 2 parts by mass.

Fluorescent Agent (D)

A dental curable composition of the present invention comprises a fluorescent agent (D). The fluorescent agent (D) comprises a 9- to 11-membered benzo-fused heterocyclic compound containing two or more heteroatoms (excluding benzoimidazole compounds). Examples of the heteroatoms include oxygen atoms, sulfur atoms, and nitrogen atoms. Preferred are oxygen atoms and nitrogen atoms. Preferably, at least one of the two or more heteroatoms in the benzo-fused heterocyclic compound is a nitrogen atom. The benzo-fused heterocyclic compound is preferably a fluorescent agent (D-1) representing a benzo-fused 6-membered heterocyclic compound having two heteroatoms (hereinafter, also referred to simply as "fluorescent agent (D-1)"). The benzo-fused 6-membered heterocyclic compound has a benzene ring fused with a 6-membered heterocyclic ring having two heteroatoms. The fluorescent agent (D-1) may be, for example, a compound having a benzodiazinone skeleton, or a compound having a benzoxazinone skeleton. Examples of the compound having a benzodiazinone skeleton include a compound (D-1a) having a quinazolinone skeleton, a compound (D-1b) having a cinnolinone skeleton, a compound (D-1c) having a phthalazinone skeleton, and a compound having a quinoxalinone skeleton (D-1d). Preferred is a quinazolinone skeleton (D-1a). By the presence of the fluorescent agent (D-1), a dental curable composition and a cured product thereof can be provided that show fluorescence sufficient to provide a high aesthetic quality, and that desirably resist discoloration not only in the intraoral environment but under accelerated heating conditions and under xenon light, without losing fluorescence even under these conditions. Such a dental curable composition and a cured product can be suitably used in applications such as dental composite resins and dental mill blanks. The exact reason why a dental curable composition of the present invention and a cured product thereof can exhibit these desirable effects is not fully understood. However, a likely explanation is the high stability of the 9- to 11-membered benzo-fused heterocyclic ring skeleton containing two or more heteroatoms, such as the benzodiazinone skeleton or benzoxazinone skeleton.

Preferably, the fluorescent agent (D-1) is a compound having at least one of a benzodiazinone skeleton (particularly preferably, a quinazolinone skeleton) and a benzoxazinone skeleton, more preferably a compound (D-1a) having a quinazolinone skeleton. The fluorescent agent (D-1) may have one benzodiazinone skeleton (particularly preferably, a quinazolinone skeleton) or one benzoxazinone skeleton, or may have more than one benzodiazinone skeleton or more than one benzoxazinone skeleton.

The benzodiazinone skeleton is represented by the following general formula (5).

[Chem. 8]

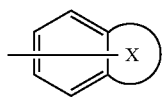

(5)

wherein X represents a 6-membered heterocyclic ring having two nitrogen atoms. The 6-membered heterocyclic ring has at least one oxo group (=O), and may be optionally substituted. Preferably, X is an aromatic heterocyclic ring, and has one —NH— in the ring. The number of oxo groups is not particularly limited, and may be 1 or 2, preferably 1. Specifically, X represents a moiety represented by any one of the following formulae (X-1) to (X-5), preferably a moiety represented by formula (X-3) or (X-4), more preferably a moiety represented by formula (X-3).

[Chem. 9]

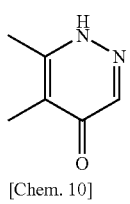

(x-1)

[Chem. 10]

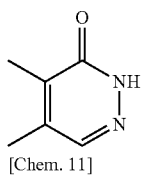

(x-2)

[Chem. 11]

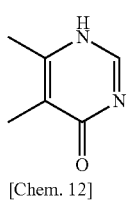

(x-3)

[Chem. 12]

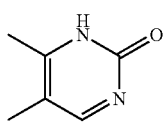

(x-4)

[Chem. 13]

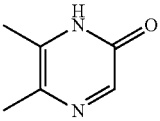

(x-5)

The benzoxazinone skeleton is represented by the following general formula (6).

[Chem. 14]

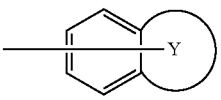

(6)

where Y represents a 6-membered heterocyclic ring having one nitrogen atom and one oxygen atom. The 6-membered heterocyclic ring has at least one oxo group, and may be optionally substituted. Y is preferably an aromatic heterocyclic ring. The number of oxo groups is not particularly limited, and may be 1 or 2, preferably 1. Specifically, Y represents a moiety represented by any one of the following formulae (Y-1) to (Y-6), preferably a moiety represented by formula (Y-5) or (Y-6).

[Chem. 15]

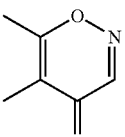

(Y-1)

[Chem. 16]

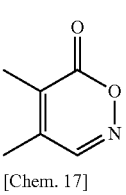

(Y-2)

[Chem. 17]

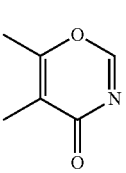

(Y-3)

[Chem. 18]

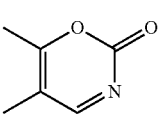

(Y-4)

[Chem. 19]

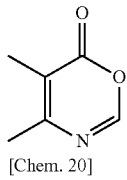

(Y-5)

[Chem. 20]

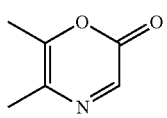

(Y-6)

The benzodiazinone skeleton (particularly preferably, a quinazolinone skeleton) and the benzoxazinone skeleton may or may not have a substituent.

Examples of the substituent include a hydroxyl group, a thiol group, a nitro group, a halogen atom, an alkyl group having 1 to 10 carbon atoms, an alkenyl group (such as a vinyl group or an allyl group), an alkoxy group having 1 to 10 carbon atoms, an aromatic group (such as a phenyl group, a naphthyl group, or a styryl group), a C1 to C10 halogenated alkyl group substituted with a halogen atom, an acyl group (such as an acetyl group), an amino group, an alkylamino group (such as a methylamino group), a dialkylamino group (such as a dimethylamino group), an aminoalkyl group (such as an aminoethyl group), a carboxy group, an alkoxycarbonyl group (such as a methoxycarbonyl group), an alkoxycarbonylalkyl group (such as a methoxycarbonylmethyl group), an alkyloxyalkyl group (such as a methyloxymethyl group), an alkylthioalkyl group (such as a methylthiomethyl group), an aminoalkylaminoalkyl group (such as an aminomethylaminomethyl group), an alkylcarbonyloxy group (such as a methylcarbonyloxy group), an arylalkoxyalkoxyalkyl group (such as a benzyloxyethoxyethyl group), a hydroxyalkoxyalkyl group (such as a hydroxyethoxymethyl group), an arylalkoxyalkyl group (such as a benzyloxymethyl group), a quaternary ammonio group (such as a trimethylammonio group), a cycloalkyl group (such as a cyclopropyl group), an alkoxycarbonyl group (such as a tert-butoxycarbonyl group), a substituted sulfonyl group (such as a p-toluenesulfonyl group), a substituted sulfoneamide group (such as a benzenesulfoneamide group), an acryloyl group (such as a benzoyl group), and an oxygen atom (=O). The number of substituents may be 1 to 10, 1 to 6, or 1 to 3. The substituents may be combined with each other. For example, the substituent may be substituted with any of the above substituents, or may have no substituent.

The fluorescent agent (D-1) is preferably a compound having a moiety represented by the following general formula (1) or (2).

[Chem. 21]

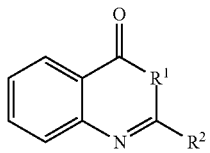

(1)

[Chem. 22]

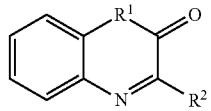

(2)

wherein $R^1$ in general formulae (1) and (2) is an oxygen atom or —NH—, and $R^2$ in general formulae (1) and (2) represents an optionally substituted aromatic group.

Examples of the aromatic group represented by $R^2$ include:

aryl groups such as a phenyl group, a biphenylyl group, a terphenylyl group, a styryl group, a naphthyl group, an anthryl group, an acenaphthenyl group, a fluorenyl group, a phenanthryl group, and an indenyl group;

aralkyl groups such as a benzyl group, a phenethyl group, a 1-phenylethyl group, a 2-phenylpropyl group, a 3-phenylpropyl group, a phenylbutyl group, a 1-methyl-3-phenylpropyl group, a naphthylmethyl group, a naphthylethyl group, a naphthylpropyl group, and a naphthylbutyl group; and heteroaromatic rings such as a pyrenyl group, a pyrimidyl group, a furanyl group, a pyronyl group, a thienyl group, a quinolyl group, a benzofuranyl group, a benzothiophenyl group, an indolyl group, a carbazolyl group, a carbolyl group, a benzoxazolyl group, a quinoxalyl group, a benzoimidazolyl group, a pyrazolyl group, a dibenzofuranyl group, and a dibenzothiophenyl group.

In view of fluorescence and durability, preferred are a phenyl group, a naphthyl group, and a styryl group.

The aromatic group represented by $R^2$ may or may not have a substituent. Examples of the substituent include the substituents exemplified as substituents of the benzodiazinone skeleton and benzoxazinone skeleton. In view of fluorescence and durability, the substituent is preferably a hydroxyl group, a halogen atom, an alkyl group having 1 to 3 carbon atoms, a C1 to C3 halogenated alkyl group substituted with a halogen atom, a dimethylamino group, a carboxy group, or a benzenesulfoneamide group. The number of substituents may be 1 to 20, 1 to 10, 1 to 6, or 1 to 3. The substituents may be combined with each other. For example, the substituent may be substituted with any of the above substituents, or may have no substituent.

In view of fluorescence and durability, the fluorescent agent (D-1) is preferably 2-(2-hydroxyphenyl)-4(1H)-quinazolinone, 2-(2-hydroxyphenyl)-4H-3,1-benzoxazin-4-one, N-[2-(4(1H)-quinazolinon-2-yl)phenyl]benzenesulfoneamide, N-[2-(4-oxo-1,3-benzoxazin-2-yl)phenyl]benzenesulfoneamide, 7-dimethylamino-3-[2-[4-(trifluoromethyl)phenyl]ethenyl]-2H-1,4-benzoxazin-2-one, 7-dimethylamino-3-[2-[2,3,4,5,6-pentafluorophenyl]ethenyl]-2H-1,4-benzoxazin-2-one, or 7-dimethylamino-3-[2-[2,4-bis(trifluoromethyl)phenyl]ethenyl]-2H-1,4-benzoxazin-2-one, more preferably 2-(2-hydroxyphenyl)-4(1H)-quinazolinone, or N-[2-(4-oxo-1,3-benzoxazin-2-yl)phenyl]benzenesulfoneamide.

The content of the fluorescent agent (D-1) in a dental curable composition of the present invention is not particularly limited. However, in order for the dental curable composition to exhibit sufficient fluorescence, the content of the fluorescent agent (D-1) is preferably at least 0.0001 parts by mass, more preferably at least 0.0002 parts by mass, even more preferably at least 0.0005 parts by mass, particularly preferably at least 0.001 parts by mass relative to total 100 parts by mass of polymerizable monomer (A) and inorganic filler (B), and is preferably at least 0.0005 parts by mass, more preferably at least 0.001 parts by mass, even more preferably at least 0.002 parts by mass, particularly preferably at least 0.005 parts by mass relative to total 100 parts by mass of polymerizable monomer (A). Because an excessively high content of fluorescent agent (D-1) may harm the aesthetics of the dental curable composition, the content of the fluorescent agent (D-1) is preferably at most 3 parts by mass, more preferably at most 1 part by mass, even more preferably at most 0.5 parts by mass, particularly preferably at most 0.1 parts by mass relative to total 100 parts by mass of polymerizable monomer (A) and inorganic filler (B), and is preferably at most 5 parts by mass, more preferably at most 1 part by mass, even more preferably at most 0.5 parts by mass, particularly preferably at most 0.2 parts by mass relative to total 100 parts by mass of polymerizable monomer (A). The fluorescent agent (D-1) may be used alone, or two or more thereof may be used in combination. By using two or more fluorescent agents (D-1) in combination, the color of the fluorescence of a cured product of a dental curable composition of the present invention can be adjusted as desired by varying the fractions of the fluorescent agents (D-1). That is, a highly aesthetic dental curable composition can be provided that can exhibit fluorescence even closer to that of natural teeth.

In addition to the fluorescent agent (D-1), a dental curable composition of the present invention preferably comprises a fluorescent agent (D-2)—another fluorescent agent (D) representing a benzo-fused 5-membered heterocyclic compound having one nitrogen atom and one oxygen atom. The benzo-fused 5-membered heterocyclic compound has a benzene ring fused with a 5-membered heterocyclic ring having one nitrogen atom and one oxygen atom. Examples of the fluorescent agent (D-2) include a fluorescent agent (D-2a), which is a compound having a benzoxazole skeleton (hereinafter, also referred to simply as "fluorescent agent (D-2a)"), and a fluorescent agent (D-2b), which is a compound having a benzisoxazole skeleton. Particularly preferably, the fluorescent agent (D-2) is a fluorescent agent (D-2a), a compound having a benzoxazole skeleton. By using the fluorescent agent (D-1) with the fluorescent agent (D-2), the color of the fluorescence of a cured product of a dental curable composition of the present invention can be adjusted as desired by varying the fractions of these fluorescent agents. That is, a highly aesthetic dental curable composition can be provided that can exhibit fluorescence even closer to that of natural teeth, and that has desirable discoloration resistance and fluorescence durability.

The fluorescent agent (D-2a) means a compound having a benzoxazole skeleton, as represented by formula (7) below. The fluorescent agent (D-2a) may have a plurality of benzoxazole skeletons. The benzoxazole skeleton may or may not have a substituent. Examples of the substituent include the substituents exemplified as substituents of the quinazolinone skeleton and benzoxazinone skeleton. In view of fluorescence and durability, the substituent is preferably a hydroxyl group, a halogen atom, or an alkyl group having 1 to 3 carbon atoms. The number of substituents may be 1 to 20, 1 to 10, 1 to 6, or 1 to 3. The substituent may or may not have a substituent.

[Chem. 23]

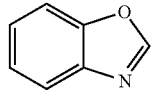

(7)

In view of a color of fluorescence and durability, the fluorescent agent (D-2a) is preferably a compound having a moiety represented by the following general formula (3).

[Chem. 24]

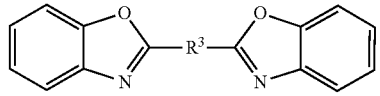

(3)

wherein $R^3$ represents an optionally substituted aromatic group, or an optionally substituted vinylene group.

Examples of the aromatic group represented by $R^3$ include divalent groups of the groups exemplified as aromatic groups represented by $R^2$ of the general formulae (1) and (2). Preferred are a phenylene group, a naphthylene group, and a thienylene group.

Compounds represented by the general formula (3) may or may not have a substituent. The substituent may be, for example, any of the substituents exemplified as substituents of the benzoxazole skeleton.

In view of fluorescence and durability, the fluorescent agent (D-2a) as a compound having a benzoxazole skeleton is preferably 1,4-bis(2-benzoxazolyl)naphthalene, 4,4'-bis(2-benzoxazolyl)stilbene, 1,2-bis(5-methylbenzoxazol-2-yl)ethene, 4,4'-bis(5-methyl-2-benzoxazolyl)stilbene, 4-(2-benzoxazolyl)-4'-(5-methyl-2-benzoxazolyl)stilbene, 2,5-bis(benzoxazol-2-yl)thiophene, or 2,5-bis(5-tert-butyl-2-benzoxazolyl)thiophene.

The content of the fluorescent agent (D-2) in a dental curable composition of the present invention is not particularly limited. However, in order for the dental curable composition to exhibit sufficient fluorescence, the content of fluorescent agent (D-2) is preferably at least 0.0001 parts by mass, more preferably at least 0.0002 parts by mass, even more preferably at least 0.0005 parts by mass, particularly preferably at least 0.001 parts by mass relative to total 100 parts by mass of polymerizable monomer (A) and inorganic filler (B). In order for the dental curable composition to exhibit sufficient fluorescence, the content of fluorescent agent (D-2) is preferably at least 0.0005 parts by mass, more preferably at least 0.001 parts by mass, even more preferably at least 0.002 parts by mass, particularly preferably at least 0.005 parts by mass relative to total 100 parts by mass of polymerizable monomer (A). Because an excessively high content of fluorescent agent (D-2) may harm the aesthetics of the dental curable composition, the content of fluorescent agent (D-2) is preferably at most 3 parts by mass, more preferably at most 1 part by mass, even more preferably at most 0.5 parts by mass, particularly preferably at most 0.1 parts by mass relative to total 100 parts by mass of polymerizable monomer (A) and inorganic filler (B). For considerations such as possible impairment of the aesthetic quality of the dental curable composition, the content of fluorescent agent (D-2) is preferably at most 5 parts by mass, more preferably at most 1 part by mass, even more preferably at most 0.5 parts by mass, particularly preferably at most 0.2 parts by mass relative to total 100 parts by mass of polymerizable monomer (A). The fluorescent agent (D-2) may be used alone, or two or more thereof may be used in combination. A certain embodiment of a dental curable composition of the present invention is, for example, a dental curable composition that comprises a polymerizable monomer (A), an inorganic filler (B), a polymerization initiator (C), and a fluorescent agent (D), wherein the fluorescent agent (D) comprises a 9- to 11-membered benzo-fused heterocyclic compound containing two or more heteroatoms (excluding benzoimidazole compounds), and the 9- to 11-membered benzo-fused heterocyclic compound containing two or more heteroatoms contains no fluorescent agent (D-1) but contains a fluorescent agent (D-2).

A dental curable composition of the present invention may comprise a fluorescent agent (D-3) containing a phthalic acid ester, provided that the present invention can exhibit its effects. The fluorescent agent (D-3) containing a phthalic acid ester is different from the fluorescent agents (D-1) and (D-2). The fluorescent agent (D-3) containing a phthalic acid ester is represented by the following general formula (8).

[Chem. 25]

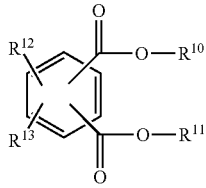

(8)

wherein $R^{10}$ and $R^{11}$ are each independently an alkyl group, $R^{12}$ is a hydrogen atom, an amino group, or a hydroxyl group, and $R^{13}$ is an amino group or a hydroxyl group.

The alkyl group is preferably an alkyl group having 1 to 3 carbon atoms, such as methyl, ethyl, n-propyl, or i-propyl, particularly preferably an alkyl group having 1 to 2 carbon atoms.

Because the presence of the fluorescent agent (D-3) in a dental curable composition of the present invention can cause a change in the shade of the dental curable composition (yellowing), the content of fluorescent agent (D-3) is preferably at most 0.5 parts by mass, more preferably at most 0.1 parts by mass, even more preferably at most 0.01 parts by mass, particularly preferably zero (fluorescent agent (D-3) is absent) relative to total 100 parts by mass of polymerizable monomer (A) and inorganic filler (B). Because the presence of fluorescent agent (D-3) in a dental curable composition of the present invention can cause a change in the shade of the dental curable composition (yellowing), the content of fluorescent agent (D-3) is preferably at most 0.1 parts by mass, more preferably at most 0.01 parts by mass, even more preferably at most 0.001 parts by mass, particularly preferably zero (fluorescent agent (D-3) is absent) relative to total 100 parts by mass of polymerizable monomer (A). The fluorescent agent (D-3) may be used alone, or two or more thereof may be used in combination. A preferred embodiment of the present invention is, for example, a dental curable composition comprising a fluorescent agent (D) with no fluorescent agent (D-3).

The fluorescent agent (D) in a dental curable composition of the present invention may additionally contain a fluorescent agent (D-4) other than the fluorescent agents (D-1), (D-2), and (D-3).

The fluorescent agent (D-4) may be selected from fluorescent agents commonly used in industry, preferably those used in dentistry. The fluorescent agent (D-4) can be broadly divided into organic fluorescent agents and inorganic fluorescent agents. The fluorescent agent (D-4) may be used alone, or two or more thereof may be used in combination.

Examples of the organic fluorescent agents include coumarin fluorescent agents, naphthalimide fluorescent agents, xanthene fluorescent agents, thioxanthene fluorescent agents, naphtholactam fluorescent agents, thiazine fluorescent agents, oxazole fluorescent agents, furan fluorescent agents, benzofuran fluorescent agents, pyrazoline fluorescent agents, stilbene fluorescent agents, distyrylbenzene fluorescent agents, distyrylbiphenyl fluorescent agents, benzoimidazole compounds, 1,3,5-triazin-2-yl derivatives, aryl benzoguanamine fluorescent agents, and polycyclic aromatic hydrocarbon fluorescent agents.

Examples of the inorganic fluorescent agents include $Y_2SiO_5$:Ce, $Y_2SiO_5$:Tb, $(Y,Gd,Eu)BO_3$, $Y_2O_3$:Eu, YAG:Ce, $ZnGa_2O_4$:Zn, $BaMgAl_{10}O_{17}$:Eu, $BaMgAl_{10}O_{17}$:Eu, $(SrCaBaMg)_5(PO_4)_3Cl$:Eu, $Zn_2SiO_4$:Mn, $BaMg_2Al_{16}O_{27}$:Eu, $BaMg_2Al_{16}O_{27}$:Eu,Mn, $BaMg_2Al_{16}O_{27}$:Mn, $LaPO_4$:Ce, $LaPO_4$:Tb, $LaPO_4$:Ce,Tb, $Y_3Al_5O_{12}$:Ce, and $Y_2O_2S$:Eu. In view of a color of fluorescence, $Y_2SiO_5$:Ce is preferred.

Polymerization Accelerator (E)

A dental curable composition of the present invention may further comprise a polymerization accelerator (E). Examples of the polymerization accelerator include amines, sulfinic acids and salts thereof, derivatives of barbituric acid, borate compounds, triazine compounds, copper compounds, tin compounds, vanadium compounds, halogen compounds, aldehydes, thiol compounds, sulfites, bisulfites, and thiourea compounds. The polymerization accelerator (E) may be used alone, or two or more thereof may be used in combination. A certain preferred embodiment may be a dental curable composition in which the polymerization initiator (C) comprises a photopolymerization initiator, and the dental curable composition additionally comprises a polymerization accelerator (E) that is a tertiary amine. The tertiary amine is preferably a tertiary aromatic amine. The dental curable composition of such a preferred embodiment is more suited as a dental composite resin.

The amines can be classified into aliphatic amines and aromatic amines. Examples of the aliphatic amines include primary aliphatic amines such as n-butylamine, n-hexylamine, and n-octylamine; secondary aliphatic amines such as diisopropylamine, dibutylamine, and N-methylethanolamine; and tertiary aliphatic amines such as N-methyldiethanolamine, N-ethyldiethanolamine, N-n-butyldiethanolamine, N-lauryldiethanolamine, 2-(dimethylamino)ethyl methacrylate, N-methyldiethanolamine dimethacrylate, N-ethyldiethanolamine dimethacrylate, triethanolamine monomethacrylate, triethanolamine dimethacrylate, triethanolamine trimethacrylate, triethanolamine, trimethylamine, triethylamine, and tributylamine. In view of curability and storage stability of the dental curable composition, preferred for use are tertiary aliphatic amines, more preferably N-methyldiethanolamine and triethanolamine.

Examples of the aromatic amines include N,N-bis(2-hydroxyethyl)-3,5-dimethylaniline, N,N-bis(2-hydroxyethyl)-p-toluidine, N,N-bis(2-hydroxyethyl)-3,4-dimethylaniline, N,N-bis(2-hydroxyethyl)-4-ethylaniline, N,N-bis(2-hydroxyethyl)-4-isopropylaniline, N,N-bis(2- hydroxyethyl)-4-t-butylaniline, N,N-bis(2-hydroxyethyl)-3,5-di-isopropylaniline, N,N-bis(2-hydroxyethyl)-3,5-di-t-butylaniline, N,N-dimethylaniline, N,N-dimethyl-p-toluidine, N,N-dimethyl-m-toluidine, N,N-diethyl-p-toluidine, N,N-dimethyl-3,5-dimethylaniline, N,N-dimethyl-3,4-dimethylaniline, N,N-dimethyl-4-ethylaniline, N,N-dimethyl-4-isopropylaniline, N,N-dimethyl-4-t-butylaniline, N,N-dimethyl-3,5-di-t-butylaniline, ethyl 4-(N,N-dimethylamino)benzoate, methyl 4-(N,N-dimethylamino)benzoate, 2-butoxyethyl 4-(N,N-dimethylamino)benzoate, 2-(methacryloyloxy)ethyl 4-(N,N-dimethylamino)benzoate, 4-(N,N-dimethylamino)benzophenone, and butyl 4-(N,N-dimethylamino)benzoate. In view of the ability to impart desirable curability to the dental curable composition, preferred for use is at least one selected from the group consisting of N,N-bis(2-hydroxyethyl)-p-toluidine, ethyl 4-(N,N-dimethylamino)benzoate, 2-butoxyethyl 4-(N,N-dimethylamino)benzoate, and 4-(N,N-dimethylamino)benzophenone.

Examples of the sulfinic acids and salts thereof include p-toluenesulfinic acid, sodium p-toluenesulfinate, potassium p-toluenesulfinate, lithium p-toluenesulfinate, calcium p-toluenesulfinate, benzenesulfinic acid, sodium benzenesulfinate, potassium benzenesulfinate, lithium benzenesulfinate, calcium benzenesulfinate, 2,4,6-trimethylbenzenesulfinic acid, sodium 2,4,6-trimethylbenzenesulfinate, potassium 2,4,6-trimethylbenzenesulfinate, lithium 2,4,6-trimethylbenzenesulfinate, calcium 2,4,6-trimethylbenzenesulfinate, 2,4,6-triethylbenzenesulfinic acid, sodium 2,4,6-triethylbenzenesulfinate, potassium 2,4,6-triethylbenzenesulfinate, lithium 2,4,6-triethylbenzenesulfinate, calcium 2,4,6-triethylbenzenesulfinate, 2,4,6-triisopropylbenzenesulfinic acid, sodium 2,4,6-triisopropylbenzenesulfinate, potassium 2,4,6-triisopropylbenzenesulfinate, lithium 2,4,6-triisopropylbenzenesulfinate, and calcium 2,4,6-triisopropylbenzenesulfinate. Particularly preferred are sodium benzenesulfinate, sodium p-toluenesulfinate, and sodium 2,4,6-triisopropylbenzenesulfinate.

Examples of the derivatives of barbituric acid include barbituric acid, 1,3-dimethylbarbituric acid, 1,3-diphenylbarbituric acid, 1,5-dimethylbarbituric acid, 5-butylbarbituric acid, 5-ethylbarbituric acid, 5-isopropylbarbituric acid, 5-cyclohexylbarbituric acid, 1,3,5-trimethylbarbituric acid, 1,3-dimethyl-5-ethylbarbituric acid, 1,3-dimethyl-5-n-butylbarbituric acid, 1,3-dimethyl-5-isobutylbarbituric acid, 1,3-dimethyl-5-cyclopentylbarbituric acid, 1,3-dimethyl-5-cyclohexylbarbituric acid, 1,3-dimethyl-5-phenylbarbituric acid, 1-cyclohexyl-1-ethylbarbituric acid, 1-benzyl-5-phenylbarbituric acid, 5-methylbarbituric acid, 5-propylbarbituric acid, 1,5-diethylbarbituric acid, 1-ethyl-5-methylbarbituric acid, 1-ethyl-5-isobutylbarbituric acid, 1,3-diethyl-5-butylbarbituric acid, 1-cyclohexyl-5-methylbarbituric acid, 1-cyclohexyl-5-ethylbarbituric acid, 1-cyclohexyl-5-octylbarbituric acid, 1-cyclohexyl-5-hexylbarbituric acid, 5-butyl-1-cyclohexylbarbituric acid, 1-benzyl-5-phenylbarbituric acid, thiobarbituric acid, and salts of these (particularly preferred are alkali metal salts or alkali earth metal salts). Examples of the salts of barbituric acid include sodium 5-butylbarbiturate, sodium 1,3,5-trimethylbarbiturate, and sodium 1-cyclohexyl-5-ethylbarbiturate.

Particularly preferred as derivatives of barbituric acid are, for example, 5-butylbarbituric acid, 1,3,5-trimethylbarbituric acid, 1-cyclohexyl-5-ethylbarbituric acid, 1-benzyl-5-phenylbarbituric acid, and sodium salts of these barbituric acids.

The borate compounds are preferably arylborate compounds. Examples of the arylborate compounds include borate compounds having 1 to 4 aryl groups per molecule. In view of storage stability, preferred as arylborate compounds are borate compounds having 3 or 4 aryl groups per molecule. Examples of the borate compounds having 3 aryl groups per molecule include monoalkyl triphenylboron, monoalkyl tri(p-chlorophenyl)boron, monoalkyl tri(p-fluorophenyl)boron, monoalkyl tri[3,5-bis(trifluoromethyl)phenyl]boron, monoalkyl tri[3,5-bis(1,1,1,3,3,3-hexafluoro-2-methoxy-2-propyl)phenyl]boron, monoalkyl tri(p-nitrophenyl)boron, monoalkyl tri(m-nitrophenyl)boron, monoalkyl tri(p-butylphenyl)boron, monoalkyl tri(m-butylphenyl)boron, monoalkyl tri(p-butyloxyphenyl)boron, monoalkyl tri(m-butyloxyphenyl)boron, monoalkyl tri(p-octyloxyphenyl)boron, monoalkyl tri(m-octyloxyphenyl)boron (the alkyl groups in these example compounds are, for example, n-butyl, n-octyl, or n-dodecyl), and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

Examples of the borate compounds having 4 aryl groups per molecule include tetraphenylboron, tetrakis(p-chlorophenyl)boron, tetrakis(p-fluorophenyl)boron, tetrakis[3,5-bis(trifluoromethyl)phenyl]boron, tetrakis[3,5-bis(1,1,1,3,3,3-hexafluoro-2-methoxy-2-propyl)phenyl]boron, tetrakis(p-nitrophenyl)boron, tetrakis(m-nitrophenyl)boron, tetrakis(p-butylphenyl)boron, tetrakis(m-butylphenyl)boron, tetrakis(p-butyloxyphenyl)boron, tetrakis(m-butyloxyphenyl)boron, tetrakis(p-octyloxyphenyl)boron, tetrakis(m-octyloxyphenyl)boron, (p-fluorophenyl)triphenylboron, [3,5-bis(trifluoromethyl)phenyl]triphenylboron, (p-nitrophenyl)triphenylboron, (m-butyloxyphenyl)triphenylboron, (p-butyloxyphenyl)triphenylboron, (m-octyloxyphenyl)triphenylboron, (p-octyloxyphenyl)triphenylboron, and salts of these (e.g., sodium salts, lithium salts, potassium salts, magnesium salts, tetrabutylammonium salts, tetramethylammonium salts, tetraethylammonium salts, methylpyridinium salts, ethylpyridinium salts, butylpyridinium salts, methylquinolinium salts, ethylquinolinium salts, and butylquinolinium salts).

Examples of the triazine compounds include 2,4,6-tris(trichloromethyl)-s-triazine, 2,4,6-tris(tribromomethyl)-s-triazine, 2-methyl-4,6-bis(trichloromethyl)-s-triazine, 2-methyl-4,6-bis(tribromomethyl)-s-triazine, 2-phenyl-4,6-bis(trichloromethyl)-s-triazine, 2-(p-methoxyphenyl)-4,6-bis(trichloromethyl)-s-triazine, 2-(p-methylthiophenyl)-4,6-bis(trichloromethyl)-s-triazine, 2-(p-chlorophenyl)-4,6-bis(trichloromethyl)-s-triazine, 2-(2,4-dichlorophenyl)-4,6-bis(trichloromethyl)-s-triazine, 2-(p-bromophenyl)-4,6-bis(trichloromethyl)-s-triazine, 2-(p-tolyl)-4,6-bis(trichloromethyl)-s-triazine, 2-n-propyl-4,6-bis(trichloromethyl)-s-triazine, 2-(α,α,β-trichloroethyl)-4,6-bis(trichloromethyl)-s-triazine, 2-styryl-4,6-bis(trichloromethyl)-s-triazine, 2-[2-(p-methoxyphenyl)ethenyl]-4,6-bis(trichloromethyl)-s-triazine, 2-[2-(o-methoxyphenyl)ethenyl]-4,6-bis(trichloromethyl)-s-triazine, 2-[2-(p-butoxyphenyl)ethenyl]-4,6-bis(trichloromethyl)-s-triazine, 2-[2-(3,4-dimethoxyphenyl)ethenyl]-4,6-bis(trichloromethyl)-s-triazine, 2-[2-(3,4,5-trimethoxyphenyl)ethenyl]-4,6-bis(trichloromethyl)-s-triazine, 2-(1-naphthyl)-4,6-bis(trichloromethyl)-s-triazine, 2-(4-biphenylyl)-4,6-bis(trichloromethyl)-s-triazine, 2-[2-{N,N-bis(2-hydroxyethyl)amino}ethoxy]-4,6-bis(trichloromethyl)-s-triazine, 2-[2-{N-hydroxyethyl-N-ethylamino}ethoxy]-4,6-bis(trichloromethyl)-s-triazine, 2-[2-{N-hydroxyethyl-N-methylamino}ethoxy]-4,6-bis(trichloromethyl)-s-triazine, and 2-[2-{N,N-diallylamino}ethoxy]-4,6-bis(trichloromethyl)-s-triazine.

In view of polymerization activity, particularly preferred as a triazine compound is 2,4,6-tris(trichloromethyl)-s-triazine. In view of storage stability, particularly preferred are 2-phenyl-4,6-bis(trichloromethyl)-s-triazine, 2-(p-chlorophenyl)-4,6-bis(trichloromethyl)-s-triazine, and 2-(4-biphenylyl)-4,6-bis(trichloromethyl)-s-triazine. The triazine compounds may be used alone, or two or more thereof may be used in combination.

Preferred for use as copper compounds are, for example, copper acetylacetonate, copper(II) acetate, copper oleate, copper(II) chloride, and copper(II) bromide.

Examples of the tin compounds include di-n-butyltin dimaleate, di-n-octyltin dimaleate, di-n-octyltin dilaurate, and di-n-butyltin dilaurate. Preferred as tin compounds are di-n-octyltin dilaurate and di-n-butyltin dilaurate.

The vanadium compounds are preferably vanadium compounds with valences of IV and/or V. Examples of vanadium compounds with valences of IV and/or V include compounds mentioned in JP 2003-96122 A, for example, such as vanadium(IV) oxide, vanadium(IV)oxy acetylacetonate, vanadyl oxalate, vanadyl sulfate, vanadium(IV) oxobis(1-phenyl-1,3-butanedionate), bis(maltolato)oxovanadium (IV), vanadium(V) oxide, sodium metavanadate, and ammonium metavanadate.

Preferred for use as halogen compounds are, for example, dilauryldimethylammonium chloride, lauryldimethylbenzylammonium chloride, benzyltrimethylammonium chloride, tetramethylammonium chloride, benzyldimethylcetylammonium chloride, and dilauryldimethylammonium bromide.

Examples of the aldehydes include terephthalaldehyde, and derivatives of benzaldehyde. Examples of derivatives of benzaldehyde include dimethylaminobenzaldehyde, p-methoxybenzaldehyde, p-ethoxybenzaldehyde, and p-n-octyloxybenzaldehyde. In view of curability, preferred for use is p-n-octyloxybenzaldehyde.

Examples of the thiol compounds include 3-mercaptopropyltrimethoxysilane, 2-mercaptobenzoxazole, decanethiol, and thiobenzoic acid.

Examples of the sulfites include sodium sulfite, potassium sulfite, calcium sulfite, and ammonium sulfite.

Examples of the bisulfites include sodium bisulfite and potassium bisulfite.

Examples of the thiourea compounds include 1-(2-pyridyl)-2-thiourea, thiourea, methylthiourea, ethylthiourea, N,N'-dimethylthiourea, N,N'-diethylthiourea, N,N'-di-n-propylthiourea, N,N'-dicyclohexylthiourea, trimethylthiourea, triethylthiourea, tri-n-propylthiourea, tricyclohexylthiourea, tetramethylthiourea, tetraethylthiourea, tetra-n-propylthiourea, and tetracyclohexylthiourea.

When the polymerization accelerator (E) is present in a dental curable composition of the present invention, the content of polymerization accelerator (E) is not particularly limited. However, in view of considerations such as curability of the dental curable composition obtained, the content of polymerization accelerator (E) is preferably at least 0.001 parts by mass, more preferably at least 0.01 parts by mass, even more preferably at least 0.02 parts by mass relative to total 100 parts by mass of polymerizable monomer (A). The content of polymerization accelerator (E) may be at least 0.03 parts by mass, at least 0.05 parts by mass, or at least 0.1 parts by mass. For considerations such as possible precipitation of polymerization accelerator (E) as might occur in the dental curable composition when the content of polymerization accelerator (E) is too high, the content of polymerization accelerator (E) is preferably at most 30 parts by mass, more preferably at most 20 parts by mass, even more preferably at most 10 parts by mass, particularly preferably at most 5 parts by mass relative to total 100 parts by mass of polymerizable monomer (A). The content of polymerization accelerator (E) may be at most 2 parts by mass, at most 1 part by mass, or at most 0.5 parts by mass.

Additive (F)

A dental curable composition of the present invention may optionally comprise an additive (F), for example, such as a polymerization inhibitor, a ultraviolet absorber, an antioxidant, an antimicrobial agent, a dispersant, a pH adjuster, a pigment, or a dye, other than the polymerizable monomer (A), inorganic filler (B), polymerization initiator (C), fluorescent agent (D), and polymerization accelerator (E) described above. The additive (F) may be used alone, or two or more thereof may be used in combination.

Examples of the polymerization inhibitor include 3,5-di-t-butyl-4-hydroxytoluene, hydroquinone, dibutyl hydroquinone, dibutyl hydroquinone monomethyl ether, hydroquinone monomethyl ether, and 2,6-di-t-butylphenol. These may be used alone, or two or more thereof may be used in combination. Examples of the ultraviolet absorber include benzotriazole compounds such as 2-(2-hydroxyphenyl)benzotriazole, 2-(2-hydroxy-5-methylphenyl)benzotriazole, 2-(2-hydroxy-5-ethylphenyl)benzotriazole, 2-(2-hydroxy-5-propylphenyl)benzotriazole, 2-(2-hydroxy-5-tert-octylphenyl)benzotriazole, and 2-(2-hydroxy-3-tert-butyl-5-methylphenyl)-5-chloro-2H-benzotriazole (Tinuvin 326); and benzoimidazole compounds. These may be used alone, or two or more thereof may be used in combination.

Method of Production of Dental Curable Composition

A method of production of a dental curable composition of the present invention is not particularly limited, and a dental curable composition of the present invention can be obtained by combining the components in predetermined amounts. The components may be combined in any order, at once or in two or more separate portions. Optionally, the components may be mixed or kneaded, or may be subjected to degassing, for example, vacuum degassing. The resultant dental curable composition may be charged into a single container (e.g., a syringe) to prepare a one-pack (one-paste) type dental curable composition.

Uses

A dental curable composition of the present invention and a cured product thereof are not limited to particular uses, and may be used as a variety of dental materials. Specifically, a dental curable composition of the present invention can be suitably used as, for example, a dental composite resin (for example, a composite resin for filling cavities, a composite resin for abutment construction, a composite resin for dental caps), a denture base resin, a denture base liner, an impression material, a luting material (for example, a resin cement, a resin-added glass ionomer cement), a dental bonding agent (for example, an orthodontics adhesive, an adhesive for application to cavities), a tooth fissure sealant, a resin block for CAD/CAM, a temporary crown, or an artificial teeth material. Because of high aesthetic quality and desirable mechanical strength, a dental curable composition of the present invention is particularly suited for dental composite resins, and resin blocks for CAD/CAM.

The present invention encompasses embodiments combining the foregoing features, provided that such combinations made in various forms within the technical idea of the present invention can produce the effects of the present invention.

EXAMPLES

The following describes the present invention in greater detail by way of Examples and Comparative Examples. It is to be noted, however, that the present invention is not limited to the following Examples. The following summarizes details of Examples, including the test methods and materials used in Examples.

Test Methods
Average Particle Diameter of Filler

The fillers below were measured for average particle diameter by volume with a laser diffraction particle size distribution analyzer (SALD-2300, manufactured by Shimadzu Corporation), using ethanol as dispersion medium (N=1). A scanning electron microscope (SU3500, manufactured by Hitachi High-Technologies Corporation) was also used instead for the measurement of average particle diameter.

Specific Surface Area of Inorganic Filler

The inorganic filler obtained in each Production Example was washed at 450° C. for 4 hours in an electric furnace, and, after degassing with vacuum at 100° C. for 2 hours, the specific surface area of the inorganic filler was measured by the BET method with a specific surface area measurement device (BELSORP-mini II, manufactured by MicrotracBEL Corp.), using nitrogen as adsorbate gas and at a measurement temperature of 77 K (N=1). For the measurement, a multi-point BET analysis was adopted by taking 5 points on the adsorption isotherm in the pressure ($P/P_0$) range of 0.05 to 0.3, where P is the adsorbate equilibrium pressure (kPa), and $P_0$ is the saturated vapor pressure (kPa)

Mechanical Strength (Flexural Strength): Dental Composite Resin

The dental curable compositions produced in Examples and Comparative Examples were degassed in vacuum, and each was charged into a stainless-steel mold (dimensions: 2 mm×2 mm×25 mm). With the dental curable composition being pressed between glass slides from top and bottom, light was applied through the glass slides from both sides to cure the dental curable composition. Here, light was applied at 5 points each side, 10 seconds at each point, using a dental visible-light photoirradiator (PenCure 2000, manufactured by J. Morita Corp.). A total of five cured products were prepared as specimens for each Example and Comparative Example. The cured product was stored in 37° C. distilled water for 24 hours after being taken out of the mold. For measurements, the cured product specimens were measured for three-point flexural strength according to JIS T 6514:2015 and ISO 4049:2019 at a span length of 20 mm and a crosshead speed of 1 mm/min, using a universal testing machine (AG-I, 100 kN, manufactured by Shimadzu Corporation under this trade name). From the measured values, a mean value was calculated for each specimen to find the flexural strength. The preferred flexural strength is 100 MPa or more, more preferably 110 MPa or more, even more preferably 120 MPa or more.

Mechanical Strength (Flexural Strength): Dental Mill Blank

A total of 10 specimens (each measuring 1.2 mm×4 mm×14 mm) were prepared from a cured product of the dental curable composition produced in each Example and Comparative Example, using a diamond cutter. After being immersed in 37° C. distilled water for 24 hours, the specimens were measured for three-point flexural strength according to JDMAS 245:2017 (Resin Material for CAD/CAM Crowns by Milling and Machining) at a span length of 12 mm and a crosshead speed of 1 mm/min, using a universal testing machine (AG-I, 100 kN, manufactured by Shimadzu Corporation under this trade name). From the measured values, a mean value was calculated for each specimen to find the flexural strength (N=10). The preferred flexural strength is 150 MPa or more, more preferably 165 MPa or more, even more preferably 180 MPa or more.

Shade of Cured Product: Dental Composite Resin

A cover glass was placed on a glass slide, and, with a stainless-steel mold (Ø=10 mm, thickness=1 mm) set on the cover glass, the dental composite material obtained in each Example and Comparative Example was filled into the mold until there was a slight overflow. With another cover glass and an overlying glass slide placed on the composite material, a downward force was applied to push out the excess composite material from the mold. The composite material was then cured by applying light for 10 seconds, using a dental visible-light photoirradiator (PenCure 2000, manufactured by J. Morita Corp.). After curing, the cover glasses, glass slides, and mold were removed to obtain a cured product specimen.

The shade of the cured product was evaluated with a spectrophotometer (SE 6000, manufactured by Nippon Denshoku Industries Co., Ltd.). Specifically, the cured product was measured for lightness (L*/w) and chromaticities (a*/w and b*/w), which represent a lightness index L* and chromaticities a* and b*, respectively, in the L*a*b* color system of JIS Z 8781-4:2013 in a measurement of chromaticity against a standard white plate placed behind the specimen. The cured product was also measured for lightness (L*/b), which represents a lightness index L* in the L*a*b* color system in a measurement of chromaticity against a standard black plate placed behind the same specimen. The difference ΔL* of L*/w and L*/b was calculated as an index of transparency (N=1).

Shade of Cured Product: Dental Mill Blank

A plate-shaped specimen (measuring 10 mm×10 mm×1.2 mm) was prepared from a cured product of the dental curable composition produced in each Example and Comparative Example, using a diamond cutter. A flat surface of the specimen was ground in succession with abrasive papers #1500, #2000, and #3000, in this order, under dry conditions, until the specimen had an adjusted thickness of 1.0 mm. The shade of the specimen was then measured with a spectrophotometer (SE 6000, manufactured by Nippon Denshoku Industries Co., Ltd.), in the same manner as in the measurement of the dental composite resin (N=1).

In view of aesthetics, the preferred value of L*/w for the dental composite resin and the dental mill blank is 80 or more, more preferably 82 or more, even more preferably 85 or more, particularly preferably 87 or more. L*/w may be as high as 98. The value of a*/w indicates the intensity of red color, with lower a*/w values indicating stronger shades of green, and higher a*/w values indicating stronger shades of red. In view of aesthetics, the preferred value of a*/w is higher than −10, more preferably −9 or greater, even more preferably −8 or greater. The value of a*/w is preferably 8 or less, more preferably 7 or less, even more preferably 5 or less. The value of b*/w indicates the intensity of yellow color, with lower b*/w values indicating stronger shades of blue, and higher b*/w values indicating stronger shades of yellow. In view of aesthetics, the preferred value of b*/w is 0 or greater, more preferably 2 or greater, even more preferably 5 or greater. The value of b*/w is preferably 30 or less, more preferably 25 or less, even more preferably 20 or less. Higher values of ΔL* means higher transparencies. In view of aesthetics, the preferred value of ΔL* is 15 or greater, more preferably 20 or greater, even more preferably 25 or greater. ΔL* may be as high as 50.

Discoloration Resistance of Cured Product

From each dental composite resin and dental mill blank, three specimens were prepared using the same method used in the shade evaluation of cured products, and $L^*/w$, $a^*/w$, and $b^*/w$ were measured in the same manner to determine initial lightness and initial chromaticities. As a test of durability, one of the specimens was stored in water at 37° C. for 30 days, and another specimen was stored at 60° C. for 30 days under dry conditions. The remaining one specimen was exposed to xenon light in water at 150,000 lx illuminance for 24 hours, using an accelerated weathering tester (SOLARBOX 1500e, manufactured by CO.FO.ME.GRA). After testing, each specimen was measured for $L^*/w$, $a^*/w$, and $b^*/w$, and the differences $\Delta L^*$, $\Delta a^*$, and $\Delta b^*$ from the initial lightness and initial chromaticities were determined. From the calculated values, a color difference $\Delta E^* = \{(\Delta L^*)^2 + (\Delta a^*)^2 + (\Delta b^*)^2\}^{1/2}$ was determined as an index of discoloration resistance after durability test. Lower values of ΔE* mean that the discoloration resistance is higher. The preferred value of ΔE* is 7 or less, more preferably 6 or less, even more preferably 5 or less. The results of the measurements are presented in Table 1, with "Cured product after 30 days at 37° C., wet" indicating the results for specimens stored in water at 37° C. for 30 days, and "Cured product after 30 days at 60° C., dry" indicating the results for specimens stored at 60° C. for 30 days under dry conditions. The heading "After sun test" indicates the results for specimens exposed to xenon light in water for 24 hours. The initial lightness and initial chromaticities are with reference to specimens stored in water at 37° C. for 30 days, specimens stored at 60° C. for 30 days under dry conditions, and specimens exposed to xenon light, before storage under these respective conditions.

Fluorescence of Cured Product

From each dental composite resin and dental mill blank, a single plate of specimen was prepared using the same method used in the shade evaluation of cured products. Separately, an extracted human tooth was ground to prepare a 1 mm-thick human tooth specimen. The cured product specimen and the human tooth specimen were observed under the light of a blacklight (FL20S BLB, manufactured by Toshiba Lighting and Technology Corporation), and the fluorescence intensities of these specimens were visually compared. The specimens were scored according to the following criteria.

2: The fluorescence intensity of cured product specimen is comparable to that of human tooth specimen.

1: The fluorescence intensity of cured product specimen is inferior to that of human tooth specimen.

0: Fluorescence is not observable in cured product specimen.

The cured product specimen was also tested by being exposed to xenon light for 24 hours using the same method used for the evaluation of discoloration resistance. The cured product specimen was then evaluated by scoring the fluorescence in the same fashion. The preferred fluorescence score is 2. The results are presented in Table 1, with "Initial" indicating the measurement results for specimens before 24-hour exposure to xenon light, and "After sun test" indicating the measurement results after 24-hour exposure to xenon light.

Ease of Polishing of Cured Product

For dental composite resins, the dental curable composition obtained in each Example and Comparative Example was filled into a polytetrafluoroethylene mold (inner diameter 10 mm×thickness 2.0 mm). After applying light for 10 seconds with a dental visible-light photoirradiator (PenCure 2000, manufactured by J. Morita Corp.), the cured product was taken out of the mold as a specimen. For dental mill blanks, a plate-shaped specimen (10 mm×10 mm×2.0 mm) was cut out using a diamond cutter. A flat surface of each specimen was ground with #600 abrasive paper under dry conditions. After grinding, the surface was polished wet with a silicone point, brown (M2 HP, manufactured by Shofu Inc.) at a rotational speed of about 5,000 rpm for 10 seconds, and then with a silicone point, blue (M3 HP, manufactured by Shofu Inc.) at a rotational speed of about 5,000 rpm for 10 seconds, using a laboratory micromotor Volvere RX (manufactured by NSK). The glossiness of the polished surface was then measured with a gloss meter (VG-2000, manufactured by Nippon Denshoku Industries Co., Ltd.; a measurement angle of 60 degrees), and a percentage of glossiness relative to the glossiness of a mirror was determined as an index of ease of polishing of the cured product (N=3). The preferred glossiness is 30% or greater, more preferably 35% or greater, even more preferably 40% or greater, particularly preferably 50% or greater.

Method of Measurement of Radiopacity of Cured Product

For dental composite resins, the dental curable composition was cured with a dental visible-light photoirradiator (PenCure 2000, manufactured by J. Morita Corp.) to prepare a cured product specimen (1.5 mm in diameter×1.0 mm). For dental mill blanks, a plate-shaped specimen (10 mm×10 mm×1.0 mm) was cut out using a diamond cutter. The specimen was positioned at the center of an X-ray film (occlusal Ultra-speed DF-50, manufactured by Carestream Health) alongside an aluminum step wedge, and was irradiated with X-rays using a digital X-ray imager (Max DC70, manufactured by MORITA MFG. CORP.), with the target-film distance set at 400 mm and the tube voltage set to 70 kV. After developing, fixing, and drying the exposed film, the image density of the specimen was measured at 20 points with an optical densitometer (DENSITOMETER PDA-85, manufactured by Kodak; measurement area=3 mm in diameter). The image density of the specimen was then compared with the image density at each thickness of the aluminum step wedge to determine the radiopacity corresponding to the thickness of the aluminum plate (N=1). The preferred radiopacity is 1.0 mm or greater, more preferably 1.3 mm or greater, even more preferably 1.5 mm or greater. The radiopacity may be 2.0 mm or greater, or 3.0 mm or greater.

Materials

Polymerizable Monomer (A)

D2.6E: 2,2-Bis(4-methacryloyloxypolyethoxyphenyl)propane (average number of moles of ethyleneoxy group added: 2.6)

Bis-GMA: 2,2-Bis[4-(3-methacryloyloxy-2-hydroxypropoxy)phenyl]propane

UDMA: 2,2,4-Trimethylhexamethylenebis(2-carbamoyloxyethyl)dimethacrylate

3G: Triethylene glycol dimethacrylate

TCDDMA: Tricyclodecane dimethanol dimethacrylate

Inorganic Filler (B)

The fillers obtained in the Production Examples below were used. Commercially available fillers were also used, without any pre-conditioning.

Production Example 1

Production of B-1 (Silica-Zirconia)

Zirconium oxynitrate (32.5 g) was dissolved in 325 g of distilled water. While stirring the solution, 425 g of a commercially available silica sol (SNOWTEX OL, manufactured by Nissan Chemical Corporation) was gradually added to obtain a mixture. A mixture powder obtained by freeze drying the mixture was then charged into an alumina crucible. After heating the crucible in an electric furnace at a rate of temperature increase of 2° C./min, the powder was fired at 600° C. for 1 hour, and pulverized for 240 minutes with a planetary ball mill (Classic Line P-6, manufactured by Fritsch; zirconia ball). After pulverization, the powder was hydrophobized in a surface treatment using 10 parts by mass of 3-methacryloyloxypropyltrimethoxysilane (KBM-503, manufactured by Shin-Etsu Chemical Co., Ltd.) for 100 parts by mass of the powder. This produced an inorganic filler (B-1). The inorganic filler (B-1) had an average particle diameter of 3.0 μm, and a specific surface area of 146 $m^2/g$.

Production Example 2

Production of B-2 (Alumina)

An inorganic filler (B-2) was produced by a surface treatment of 100 parts by mass of an alumina fine powder (AEROXIDE Alu C, manufactured by Nippon Aerosil Co., Ltd.) with 20 parts by mass of γ-methacryloxypropyltrimethoxysilane (KBM-503, manufactured by Shin-Etsu Chemical Co., Ltd.). The inorganic filler (B-2) had an average particle diameter of 0.02 μm, and a specific surface area of 100 $m^2/g$.

Production Example 3

Production of B-3 (Barium Glass)

A three-neck flask was charged with 100 parts by mass of a commercially available barium glass (GM27884 NanoFine 180, manufactured by Schott), 7 parts by mass of 3-methacryloyloxypropyltrimethoxysilane (KBM-503, manufactured by Shin-Etsu Chemical Co., Ltd.), and 173 parts by mass of toluene, and the mixture was stirred at room temperature for 2 hours. After removing toluene by distillation under reduced pressure, the contents were vacuum dried at 40° C. for 16 hours, and heated at 90° C. for 3 hours to obtain an inorganic filler (B-3) having a surface-treated layer. The inorganic filler (B-3) had an average particle diameter of 0.2 μm, and a specific surface area of 35 $m^2/g$.

Production Example 4

Production of B-4 (Organic-Inorganic Composite Filler)

For production of B-4, 100 parts by mass of the inorganic filler (B-3) was added and mixed into 100 parts by mass of a polymerizable monomer mixture of Bis-GMA and 3G (mass ratio 1:1) containing 1 mass % of azobisisobutyronitrile (AIBN) dissolved in advance as a polymerization initiator. After preparing the mixture into a paste form, the paste was subjected to 5 hours of thermal polymerization at 100° C. in a reduced pressure atmosphere. The resulting product of polymerization and cure was pulverized with a vibration ball mill until the powder had an average particle diameter of about 5 μm. For surface treatment, 100 parts by mass of the powder was refluxed at 90° C. for 5 hours in a 2 mass % ethanol solution of γ-methacryloyloxypropyltrimethoxysilane (KBM-503, manufactured by Shin-Etsu Chemical Co., Ltd.). This produced an organic-inorganic composite filler as inorganic filler (B-4). The inorganic filler (B-4) had an average particle diameter of 5.2 μm, and a specific surface area of 35 $m^2/g$.

Production Example 5

Production of B-5 (Silica-Ytterbia)

The water in a commercially available silica-ytterbium oxide aqueous dispersion (SG-YBSO30SW, manufactured by Sukgyung AT) was removed by distillation using an evaporator, and the resulting solid component was pulverized for 180 minutes with a planetary ball mill (Classic Line P-6, manufactured by Fritsch; zirconia ball). The powder was then fired for 1 hour in an electric furnace set at 800° C., and pulverized for 180 minutes using the same planetary ball mill. The powder was hydrophobized in a surface treatment using 10 parts by mass of 3-methacryloyloxypropyltrimethoxysilane (KBM-503, manufactured by Shin-Etsu Chemical Co., Ltd.) for 100 parts by mass of the powder. This produced an inorganic filler (B-5). The inorganic filler (B-5) had an average particle diameter of 5.7 μm, and a specific surface area of 95.8 $m^2/g$.

B-6 (Ytterbium Fluoride)

A silica-coated ytterbium fluoride (SG-YBF100WSCMP10, manufactured by Sukgyung AT) was used without any pre-conditioning. The silica-coated ytterbium fluoride had an average particle diameter of 100 nm, and a specific surface area of 14.2 $m^2/g$.

Polymerization Initiator (C)

CQ: Camphorquinone

TPO: 2,4,6-Trimethylbenzoyldiphenylphosphine oxide

THP: 1,1,3,3-Tetramethylbutyl hydroperoxide

Fluorescent Agent (D-1)

D-1-1: 2-(2-Hydroxyphenyl)-4(1H)-quinazolinone (formula (9))

[Chem. 26]

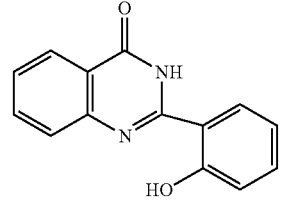

(9)

D-1-2: N-[2-(4-Oxo-1,3-benzoxazin-2-yl)phenyl]benzenesulfoneamide (formula (10))

[Chem. 27]

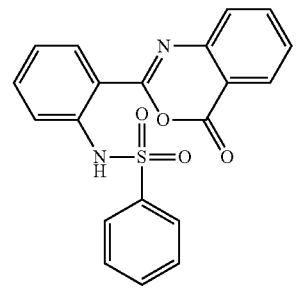

(10)

D-1-3: 7-Dimethylamino-3-[2-[4-(trifluoromethyl)phenyl]ethenyl]-2H-1,4-benzoxazin-2-one (formula (11))

[Chem. 28]

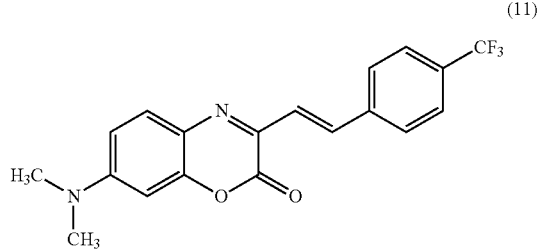

(11)

Fluorescent Agent (D-2)
D-2-1: 1,4-Bis(2-benzoxazolyl)naphthalene (formula (12))

[Chem. 29]

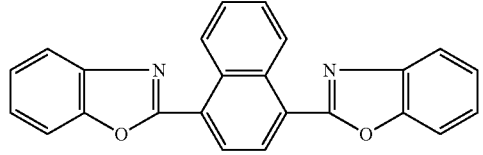

(12)

Fluorescent Agent (D-3)
D-3-1: Diethyl 2,5-dihydroxyterephthalate

Polymerization Accelerator (E)
PDE: Ethyl 4-(N,N-dimethylamino)benzoate
Additive (F)
BHT 3,5-Di-t-butyl-4-hydroxytoluene (polymerization inhibitor)
TIN: Tinuvin 326 (manufactured by BASF Japan; ultraviolet absorber)

Examples 1 to 6 and Comparative Examples 1 to 6 (Dental Composite Resin)

The materials shown in Table 1 were mixed and kneaded in the dark at ordinary temperature (23° C.) in the proportions shown in the table. After homogenization, the product was degassed in vacuum to prepare dental curable compositions. The dental curable compositions were then tested using the methods described above. The results are presented in Table 1.

Example 7 and Comparative Examples 7 and 8 (Dental Mill Blank)

The materials shown in Table 1 were mixed and kneaded in the dark at ordinary temperature (23° C.) in the proportions shown in the table. After homogenization, the product was degassed in vacuum to prepare dental curable compositions. The dental curable composition was charged into a rectangular mold measuring 20 mm×30 mm×60 mm, and was heated at 50° C. for 1 hour. This was followed by a heat treatment performed at 150° C. for 1 hour under an applied pressure of 5 MPa. The resulting cured product was obtained as a dental mill blank. The cured product of the dental curable composition was tested using the methods described above. The results are presented in Table 1.

TABLE 1

|  |  |  | Example 1 | Example 2 | Example 3 | Example 4 | Example 5 |
|---|---|---|---|---|---|---|---|
| Polymerizable monomer (A) | D2.6E | Based on total mass of polymerizable monomer (A) at 100 parts by mass [parts by mass] | 80 | 80 | 80 | 80 | 60 |
|  | Bis-GMA |  |  |  |  |  | 20 |
|  | UDMA |  |  |  |  |  |  |
|  | 3G |  | 20 | 20 | 20 | 20 | 20 |
|  | TCDDMA |  |  |  |  |  |  |
|  | Parts by mass based on 100 parts by mass of (A) + (B) |  | 25 | 25 | 25 | 25 | 9 |
| Inorganic filler (B) | B-1 (Silica-zirconia) | [parts by mass] | 64 | 64 | 64 | 64 |  |
|  | B-2 (Alumina) |  |  |  |  |  | 18 |
|  | B-3 (Barium glass) |  |  |  |  |  | 18 |
|  | B-4 (Organic-inorganic composite filler) |  |  |  |  |  | 55 |
|  | B-5 (Silica-ytterbia) |  |  |  |  |  |  |
|  | B-6 (Ytterbium fluoride) |  | 11 | 11 | 11 | 11 |  |
| Polymerization initiator (C) | CQ | Relative to total 100 parts by mass of polymerizable monomer (A) [parts by mass] | 0.3 | 0.3 | 0.3 | 0.3 | 0.5 |
|  | TPO |  | 0.2 | 0.2 | 0.2 | 0.2 | 0.5 |
|  | THP |  |  |  |  |  |  |
| Fluorescent agent (D-1) | D-1-1 |  | 0.05 |  |  | 0.05 | 0.05 |
|  | D-1-2 |  |  | 0.04 |  |  |  |
|  | D-1-3 |  |  |  | 0.05 |  |  |
| Fluorescent agent (D-2) | D-2-1 |  |  |  |  | 0.02 |  |
| Fluorescent agent (D-3) | D-3-1 |  |  |  |  |  |  |
| Polymerization accelerator (E) | PDE |  | 0.3 | 0.3 | 0.3 | 0.3 | 1.0 |
| Additive (F) | BHT |  | 0.05 | 0.05 | 0.05 | 0.05 | 0.05 |
|  | TIN |  | 0.5 | 0.5 | 0.5 | 0.5 | 0.5 |
| Shade |  | L*/w | 89.5 | 89.7 | 89.1 | 89.0 | 87.1 |
|  |  | a*/w | −6.3 | −3.6 | −6.3 | −7.1 | −7.9 |
|  |  | b*/w | 12.5 | 9.7 | 13.5 | 14.7 | 19.4 |
|  |  | ΔL* | 28.6 | 28.5 | 29.1 | 28.4 | 24.1 |
| Discoloration resistance | Cured product after 30 days at 37° C., wet | ΔE* | 2.3 | 1.4 | 3.3 | 1.7 | 2.5 |
|  | Cured product after 30 days at 60° C., dry |  | 3.7 | 2.4 | 4.1 | 2.9 | 3.1 |
|  | After sun test |  | 1.8 | 1.6 | 2.4 | 2.0 | 2.8 |

TABLE 1-continued

| | | | | | | | |
|---|---|---|---|---|---|---|---|
| Fluorescence | Initial | (Score) | 2 | 2 | 2 | 2 | 2 |
| | After sun test | | 2 | 2 | 2 | 2 | 2 |
| | Flexural strength | [MPa] | 149 | 152 | 158 | 152 | 128 |
| | Ease of polishing | [%] | 59 | 63 | 65 | 58 | 82 |
| | Radiopacity | [%] | 2.0 | 2.0 | 2.0 | 2.0 | 1.3 |

| | | | Example | | Comparative Example | | |
|---|---|---|---|---|---|---|---|
| | | | 6 | 7 | 1 | 2 | 3 |
| Polymerizable monomer (A) | D2.6E | Based on total mass of polymerizable monomer (A) at 100 parts by mass [parts by mass] | 45 | | 80 | 80 | 60 |
| | Bis-GMA | | | | | | 20 |
| | UDMA | | | 70 | | | |
| | 3G | | | 30 | 20 | 20 | 20 |
| | TCDDMA | | 55 | | | | |
| Inorganic filler (B) | Parts by mass based on 100 parts by mass of (A) + (B) | [parts by mass] | 25 | 33 | 25 | 25 | 9 |
| | B-1 (Silica-zirconia) | | | 67 | 64 | 64 | |
| | B-2 (Alumina) | | | | | | 18 |
| | B-3 (Barium glass) | | | | | | 18 |
| | B-4 (Organic-inorganic composite filler) | | | | | | 55 |
| | B-5 (Silica-ytterbia) | | 75 | | | | |
| | B-6 (Ytterbium fluoride) | | | | 11 | 11 | |
| Polymerization initiator (C) | CQ | Relative to total 100 parts by mass of polymerizable monomer (A) [parts by mass] | 0.4 | | 0.3 | 0.3 | 0.5 |
| | TPO | | 0.4 | | 0.2 | 0.2 | 0.5 |
| | THP | | | 1.0 | | | |
| Fluorescent agent (D-1) | D-1-1 | | 0.05 | | | | |
| | D-1-2 | | | 0.04 | | | |
| | D-1-3 | | | | | | |
| Fluorescent agent (D-2) | D-2-1 | | | | | | |
| Fluorescent agent (D-3) | D-3-1 | | | | | 0.05 | |
| Polymerization accelerator (E) | PDE | | 0.4 | | 0.3 | 0.3 | 1.0 |
| Additive (F) | BHT | | 0.05 | | 0.05 | 0.05 | 0.05 |
| | TIN | | 0.5 | 0.5 | 0.5 | 0.5 | 0.5 |
| Shade | | $L^*/w$ | 89.9 | 96.7 | 90.0 | 89.2 | 87.3 |
| | | $a^*/w$ | −4.7 | −3.8 | −1.5 | −10.0 | −5.8 |
| | | $b^*/w$ | 19.0 | 14.8 | 8.0 | 20.8 | 16.0 |
| | | $\Delta L^*$ | 32.1 | 33.1 | 28.1 | 29.1 | 24.3 |
| Discoloration resistance | Cured product after 30 days at 37° C., wet | $\Delta E^*$ | 2.1 | 1.1 | 0.5 | 5.4 | 1.1 |
| | Cured product after 30 days at 60° C., dry | | 3.2 | 2.5 | 2.7 | 6.9 | 0.9 |
| | After sun test | | 3.8 | 0.2 | 1.8 | 6.4 | 3.0 |
| Fluorescence | Initial | (Score) | 2 | 2 | 0 | 2 | 0 |
| | After sun test | | 2 | 2 | | 2 | |
| | Flexural strength | [MPa] | 143 | 187 | 153 | 157 | 125 |
| | Ease of polishing | [%] | 76 | 67 | 56 | 57 | 79 |
| | Radiopacity | [%] | 3.4 | 1.4 | 2.0 | 2.0 | 1.3 |

| | | | Comparative Example | | | | |
|---|---|---|---|---|---|---|---|
| | | | 4 | 5 | 6 | 7 | 8 |
| Polymerizable monomer (A) | D2.6E | Based on total mass of polymerizable monomer (A) at 100 parts by mass [parts by mass] | 60 | 45 | 45 | | |
| | Bis-GMA | | 20 | | | | |
| | UDMA | | | | | 70 | 70 |
| | 3G | | 20 | | | 30 | 30 |
| | TCDDMA | | | 55 | 55 | | |
| Inorganic filler (B) | Parts by mass based on 100 parts by mass of (A) + (B) | [parts by mass] | 9 | 25 | 25 | 33 | 33 |
| | B-1 (Silica-zirconia) | | | | | 67 | 67 |
| | B-2 (Alumina) | | 18 | | | | |
| | B-3 (Barium glass) | | 18 | | | | |
| | B-4 (Organic-inorganic composite filler) | | 55 | | | | |
| | B-5 (Silica-ytterbia) | | | 75 | 75 | | |
| | B-6 (Ytterbium fluoride) | | | | | | |
| Polymerization initiator (C) | CQ | Relative to total 100 parts by mass of polymerizable monomer (A) [parts by mass] | 0.5 | 0.4 | 0.4 | | |
| | TPO | | 0.5 | 0.4 | 0.4 | | |
| | THP | | | | | 1.0 | 1.0 |
| Fluorescent agent (D-1) | D-1-1 | | | | | | |
| | D-1-2 | | | | | | |
| | D-1-3 | | | | | | |
| Fluorescent agent (D-2) | D-2-1 | | | | | | |
| Fluorescent agent (D-3) | D-3-1 | | 0.05 | | 0.05 | | 0.05 |
| Polymerization accelerator (E) | PDE | | 1.0 | 0.4 | 0.4 | | |
| Additive (F) | BHT | | 0.05 | 0.05 | 0.05 | | |
| | TIN | | 0.5 | 0.5 | 0.5 | 0.5 | 0.5 |

TABLE 1-continued

| | | | | | | | |
|---|---|---|---|---|---|---|---|
| Shade | | L*/w | 87.2 | 90.5 | 90.2 | 96.3 | 96.2 |
| | | a*/w | −9.9 | −3.8 | −8.4 | −2.3 | −6.2 |
| | | b*/w | 23.0 | 15.2 | 26.5 | 8.4 | 21.9 |
| Discoloration resistance | Cured product after 30 days at 37° C., wet | ΔL* | 24.1 | 30.8 | 31.2 | 34.3 | 35.8 |
| | Cured product after 30 days at 60° C., dry | ΔE* | 14.8 | 0.5 | 9.0 | 0.4 | 3.2 |
| | After sun test | | 16.6 | 1.8 | 12.4 | 2.1 | 5.5 |
| Fluorescence | Initial | (Score) | 9.6 | 1.5 | 10.3 | 1.4 | 4.8 |
| | | | 2 | 0 | 2 | 0 | 2 |
| | After sun test | | 2 | | 2 | | 2 |
| | Flexural strength | [MPa] | 123 | 146 | 140 | 190 | 186 |
| | Ease of polishing | [%] | 84 | 71 | 70 | 65 | 68 |
| | Radiopacity | [%] | 1.3 | 3.4 | 3.4 | 1.4 | 1.4 |

As shown in Table 1, the dental curable compositions of the present invention showed desirable shades in the cured products, and had desirable discoloration resistance, without losing fluorescence even after the light resistance test. Particularly, in Example 5, the cured product had reduced discoloration (yellowing), despite containing alumina as inorganic filler. As can be seen from these results, the cured products of the dental curable compositions of the present invention have a high flexural strength, and are easily polishable to produce sufficient glossiness by simple polishing.

INDUSTRIAL APPLICABILITY

A dental curable composition of the present invention can produce a cured product that shows sufficient fluorescence, and that excels in aesthetics and durability while having sufficient mechanical strength and retaining ease of polishing. This makes a dental curable composition of the present invention suitable for use in applications such as dental composite resins and dental mill blanks.

The invention claimed is:

1. A dental curable composition comprising a polymerizable monomer (A), an inorganic filler (B), a polymerization initiator (C), and a fluorescent agent (D),
wherein the fluorescent agent (D) comprises a 9- to 11-membered benzo-fused heterocyclic compound containing two or more heteroatoms excluding compounds having a benzimidazole moiety, and
wherein the 9- to 11-membered benzo-fused heterocyclic compound containing two or more heteroatoms comprises a fluorescent agent (D-1) representing a benzo-fused 6-membered heterocyclic compound having two heteroatoms.

2. The dental curable composition according to claim 1, wherein the fluorescent agent (D-1) comprises a compound having a benzoxazinone skeleton and/or a compound having a skeleton represented by the following general formula (5),

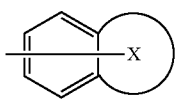

(5)

wherein X represents a 6-membered heterocyclic ring having two nitrogen atoms, and the 6-membered heterocyclic ring has at least one oxo group, and may be optionally substituted.

3. The dental curable composition according to claim 2, comprising a compound having a skeleton represented by general formula (5).

4. The dental curable composition according to claim 2, comprising a compound having a skeleton represented by general formula (5), and wherein the compound having a skeleton represented by general formula (5) is a compound (D-1a) having a quinazolinone skeleton.

5. The dental curable composition according to claim 2, wherein the fluorescent agent (D-1) comprises a compound having a benzoxazinone skeleton.

6. The dental curable composition according to claim 5, wherein the compound having a benzoxazinone skeleton is a compound having a skeleton represented by the following general formula (6),

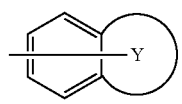

(6)

wherein Y represents a 6-membered heterocyclic ring having one nitrogen atom and one oxygen atom, and the 6-membered heterocyclic ring has at least one oxo group, and may be optionally substituted.

7. The dental curable composition according to claim 1, wherein the fluorescent agent (D-1) is a compound having a moiety represented by the following general formula (1) or (2),

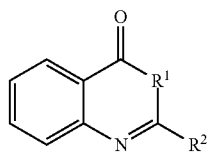

(1)

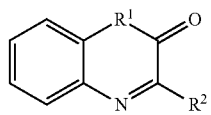

(2)

wherein $R^1$ in general formulae (1) and (2) is an oxygen atom or —NH—, and $R^2$ in general formulae (1) and (2) represents an optionally substituted aromatic group.

8. The dental curable composition according to claim claim 1, wherein the fluorescent agent (D-1) comprises at least one compound selected from the group consisting of 2-(2-hydroxyphenyl)-4 (1H)-quinazolinone, 2-(2-hydroxyphenyl)-4H-3,1-benzoxazin-4-one, N-[2-(4 (1H)-quinazolinon-2-yl)phenyl]benzenesulfoneamide, N-[2-(4-oxo-1,3-benzoxazin-2-yl)phenyl]benzenesulfoneamide, 7-dimethylamino-3-[2-[4-(trifluoromethyl)phenyl]ethenyl]-2H-1,4-benzoxazin-2-one, 7-dimethylamino-3-[2-[2,3,4,5,6-pentafluorophenyl]ethenyl]-2H-1,4-benzoxazin-2-one, and 7-dimethylamino-3-[2-[2,4-bis (trifluoromethyl) phenyl]ethenyl]-2H-1,4-benzoxazin-2-one.

9. The dental curable composition according to claim claim 1, wherein the fluorescent agent (D) further comprises a fluorescent agent (D-2) representing a benzo-fused 5-membered heterocyclic compound having one nitrogen atom and one oxygen atom.

10. The dental curable composition according to claim 9, wherein the fluorescent agent (D-2) is a fluorescent agent (D-2a) representing a compound having a benzoxazole skeleton.

11. The dental curable composition according to claim 10, wherein the fluorescent agent (D-2a) is a compound having a moiety represented by the following general formula (3),

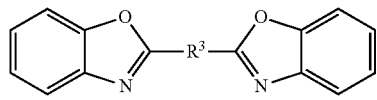

(3)

wherein $R^3$ represents an optionally substituted aromatic group, or an optionally substituted vinylene group.

12. The dental curable composition according to claim 10, wherein the fluorescent agent (D-2a) is a compound represented by the following formula (12)

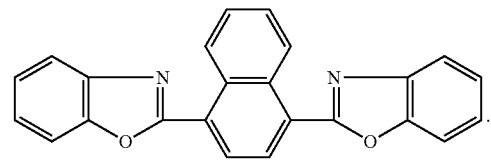

(12)

13. The dental curable composition according to claim 1, wherein the inorganic filler (B) is an inorganic filler containing at least one metal compound selected from the group consisting of zirconium oxide, aluminum oxide, ytterbium oxide, and ytterbium fluoride.

14. The dental curable composition according to claim 1, wherein the inorganic filler (B) has a specific surface area of 10 to 300 $m^2/g$.

15. A dental composite resin comprising a dental curable composition of claim 1.

16. A dental mill blank comprising a cured product of a dental curable composition of claim 1.

* * * * *